(12) United States Patent
Shibata et al.

(10) Patent No.: US 8,370,325 B2
(45) Date of Patent: Feb. 5, 2013

(54) FILE STRUCTURE ANALYZING APPARATUS, FILE STRUCTURE ANALYZING METHOD, AND PROGRAM

(75) Inventors: Yoshiaki Shibata, Kanagawa (JP); Nobuhiro Kotaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 503 days.

(21) Appl. No.: 12/372,155

(22) Filed: Feb. 17, 2009

(65) Prior Publication Data

US 2009/0216810 A1      Aug. 27, 2009

(30) Foreign Application Priority Data

Feb. 27, 2008   (JP) ................................. 2008-046651

(51) Int. Cl.
*G06F 17/30* (2006.01)
(52) U.S. Cl. ...................................................... 707/713
(58) Field of Classification Search .................. 707/200; 709/240
See application file for complete search history.

(56) References Cited

U.S. PATENT DOCUMENTS

| | | | | |
|---|---|---|---|---|
| 5,428,616 A * | 6/1995 | Field et al. | ..................... | 370/253 |
| 5,500,860 A * | 3/1996 | Perlman et al. | ................ | 370/401 |
| 5,610,595 A * | 3/1997 | Garrabrant et al. | ........... | 340/9.14 |
| 5,862,335 A * | 1/1999 | Welch et al. | .................... | 709/224 |
| 6,240,452 B1 * | 5/2001 | Welch et al. | .................... | 709/224 |

FOREIGN PATENT DOCUMENTS

| | | |
|---|---|---|
| JP | 2005-51632 | 2/2005 |
| JP | 2005-242427 | 9/2005 |
| JP | 2007-148751 | 6/2007 |
| JP | 2008-35394 | 2/2008 |

* cited by examiner

*Primary Examiner* — Sheree Brown
(74) *Attorney, Agent, or Firm* — Oblon, Spivak, McClelland, Maier & Neustadt, L.L.P.

(57) ABSTRACT

The present invention provides a file structure analyzing apparatus for analyzing a file including a group of structured data formed into a tree structure by having a plurality of distinct element packets referenced externally, each of the distinct element packets including a unique identifier for identifying the distinct element packet in question and an external referrer for indicating an external reference destination at which to reference externally another distinct element packet using the unique identifier of the latter packet, the file structure analyzing apparatus including: a distinct element packet input section; an external referrer holding section; a unique identifier holding section; and a reference relationship analysis section.

15 Claims, 28 Drawing Sheets

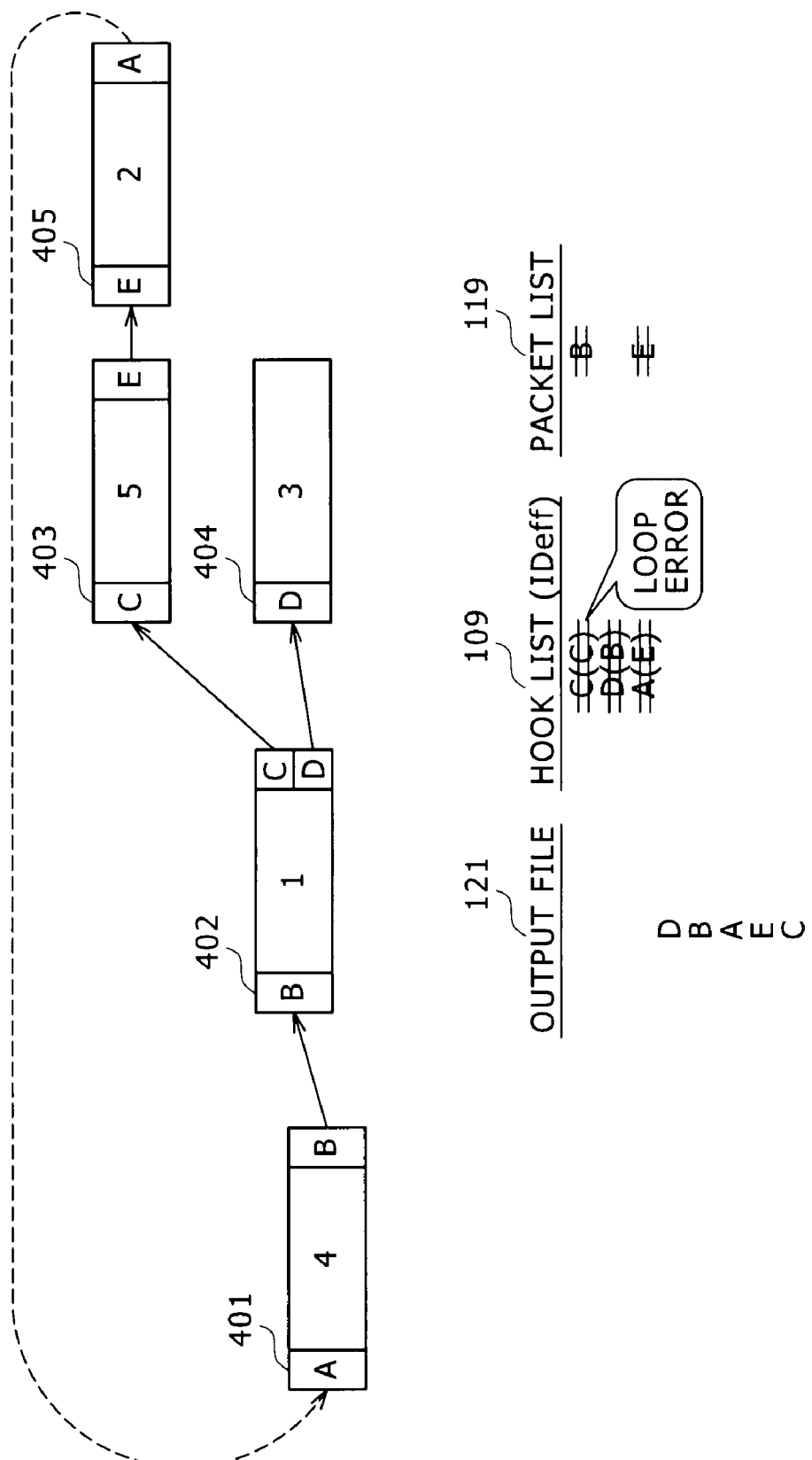

FILE STRUCTURE ANALYZING APPARATUS, FILE STRUCTURE ANALYZING METHOD, AND PROGRAM

CROSS REFERENCES TO RELATED APPLICATIONS

The present invention contains subject matter related to Japanese Patent Application JP 2008-046651 filed with the Japanese Patent Office on Feb. 27, 2008, the entire contents of which being incorporated herein by reference.

BACKGROUND OF THE INVENTION

1. Field of the Invention

The present invention relates to a file structure analyzing apparatus, a file structure analyzing method, and a program. More particularly, the invention relates to a file structure analyzing apparatus, a file structure analyzing method, and a program for analyzing the tree structure of files.

2. Description of the Related Art

Video materials are generally recorded to package media such as video tapes and are also captured and transferred by servers through diverse digital interfaces including SDI (Single Document Interface). Once captured by a server, a video material is handled as a file that may be transferred to or shared by other servers located on a network. In recent years, network-based data transmissions have taken place mostly through asynchronous transmission channels exemplified by the IP network. In such cases, the interchangeability between data files becomes critically important.

In view of the above circumstances, there have been proposed formats aimed at promoting file exchanges such as MXF (Material Exchange Format) based on the SMPTE (Society of Motion Picture and Television Engineers) 377M standard. An MXF file is a structured file made up of a file header, a file body, and a file footer. Metadata may be stored into any or all of the header, body, and footer as needed.

Specifically, the metadata stored into the file header is called header metadata. The header metadata is constituted not only by video edit information but also by metadata for content identification as well as metadata explanatory of scenes and shots. These kinds of metadata are used to express information typically constituting explanations of an entire program or descriptions of scenes on a scene-by-scene or shot-by-shot basis. Because the structure and content of an entire file can be grasped by referencing its header metadata, the header metadata may be detached from the file body and transmitted or analyzed.

When a file is transferred or handled otherwise, the header metadata of the file may be used to analyze the structure and content of the entire file. This makes it possible to verify or correct the consistency of the file. Generally, MXF files have their detailed logical structures expressed as a tree structure each. The header metadata of the MXF file is thus expressed as tree structure data illustratively for content identification. In the past, analyzing such tree structure data required that the entire header metadata be expanded collectively in an internal memory. Where the header data was enormous in size, as in the case of picture data or other huge information being stored as part of header metadata, it was often impossible to expand all header metadata simultaneously in the internal memory. That in turn made it impossible to analyze the tree structure data in question.

Illustratively, Japanese Patent Laid-open No. 2007-148751 (hereinafter referred to as Patent Document 1) discloses a technique whereby the structural description elements of header metadata are separated from its data elements so that only the separated structural description elements may be expanded in an internal memory for tree structure analysis. The disclosed technique is intended to analyze the tree structure independently of the size of the data elements.

SUMMARY OF THE INVENTION

One disadvantage of the technique disclosed in the Patent Document 1 is that it requires processes for separating the structural description elements of header metadata from its data elements. As another disadvantage, it is impossible for the disclosed technique to expand all structural description elements if the tree structure involved is complicated.

The present invention has been made in view of the above circumstances and provides a file structure analyzing apparatus, a file structure analyzing method, and a program for analyzing file structures regardless of the size and complexity of the header metadata attached to the structured files.

In carrying out the present invention and according to one embodiment thereof, there is provided a file structure analyzing apparatus for analyzing a file including a group of structured data formed into a tree structure by having a plurality of distinct element packets referenced externally, each of the distinct element packets including a unique identifier for identifying the distinct element packet in question and an external referrer for indicating an external reference destination at which to reference externally another distinct element packet using the unique identifier of the latter packet, the file structure analyzing apparatus including: a distinct element packet input section configured to input successively the plurality of distinct element packets; an external referrer holding section configured to hold temporarily the external referrer of one of the distinct element packets of which the reference destination has yet to be definitively determined; a unique identifier holding section configured to hold temporarily the unique identifier of one of the distinct element packets of which a reference source has yet to be definitively determined; and a reference relationship analysis section configured to analyze successively a reference relationship of each of the plurality of distinct element packets input to the distinct element packet input section, the reference relationship analysis section further deleting the external referrer and the unique identifier of one of the distinct element packets from the external referrer holding section and the unique identifier holding section every time the reference relationship of the distinct element packet in question is definitively determined.

Preferably, when the external referrer of the input distinct element packet is found to be the same as the unique identifier held by the unique identifier holding section, the reference relationship analysis section may conclude that the reference destination of the distinct element packet identified by the unique identifier is definitively determined and may delete the unique identifier from the unique identifier holding section; and when the unique identifier of the input distinct element packet is found to be the same as the external referrer held by the external referrer holding section, the reference relationship analysis section may conclude that the reference source of the distinct element packet associated with the external referrer is definitively determined and may delete the external referrer from the external referrer holding section.

With the above-outlined structure, a plurality of distinct element packets are input successively. The external referrer of one of the distinct element packets of which the reference destination has yet to be definitively determined is held temporarily by the external referrer holding section. The unique identifier of one of the distinct element packets of which the reference source has yet to be definitively determined is held temporarily by the unique identifier holding section. The reference relationship of each of the plurality of distinct element packets input to the distinct element packet input section is then analyzed successively by the reference relationship analysis section. Every time the reference relationship of one of the distinct element packets is definitively determined, the reference relationship analysis section deletes the external referrer and the unique identifier of the distinct element packet in question from the external referrer holding section and the unique identifier holding section.

When the reference relationships of the structured file in a tree structure are analyzed successively as outlined above, there is no need to expand all external referrers and all unique identifiers within the external referrer holding section and unique identifier holding section. This makes it possible to analyze the file structure without regard to storage capacity constraints even if the header metadata of the input file has a large size or is formed in a complicated structure.

Preferably, the external referrer holding section may hold the external referrer in paired relation with the unique identifier corresponding to the external referrer in question; and when the reference source of one of the distinct element packets is definitively determined, the reference relationship analysis section may change the unique identifier held in paired relation with the external referrer held by the external referrer holding section, into an effective unique identifier of the distinct element packet definitively determined as the reference source. The effective unique identifier refers to the unique identifier of a higher-order distinct element packet formed through synthesis of distinct element packets based on their reference relationships. In another preferred structure, when the effective unique identifier of the distinct element packet held in paired relation with the external referrer and changed by the reference relationship analysis section is found to be the same as the paired external referrer, the reference relationship analysis section can detect a tree structure loop error.

With the above-outlined preferred structure, when the reference source of one of the distinct element packets is definitively determined, the unique identifier held in paired relation with the external referrer held by the external referrer holding section may be changed into an effective unique identifier of the distinct element packet definitively determined as the reference source. In this manner, reference relationships may be definitively determined and extracted in order to synthesize a plurality of packets into a composite packet. If the composite packet is found to reference itself, a loop error can be detected. This makes it possible to analyze the tree structure of the file more accurately than before without expanding all external referrers and all unique identifiers of the distinct element packets involved.

Preferably, the file structure analyzing apparatus of an embodiment of the present invention may further include a distinct element packet storage section configured to store the distinct element packets deleted by the reference relationship analysis section. This preferred structure permits efficient file structure analysis by successively storing the distinct element packets of which the reference relationships have been definitively determined.

Preferably, the reference relationship analysis section may analyze the reference relationship of one of the plurality of distinct element packets by regarding the distinct element packet in question as a root element packet. This preferred structure makes it possible to avoid the analysis of reference relations resulting in an error when the root element is not definitively determined. The file structure is thus analyzed more reliably than before.

Preferably, the above-mentioned group of structured data may constitute header metadata of an MXF file. The MXF file is structured to have its root element definitively determined, so that a simple loop error does not exist. This provides for more reliable file structure analysis than before.

According to another embodiment of the present invention, there is provided a file structure analyzing method for analyzing a file including a group of structured data formed into a tree structure by having a plurality of distinct element packets referenced externally, each of the distinct element packets including a unique identifier for identifying the distinct element packet in question and an external referrer for indicating an external reference destination at which to reference externally another distinct element packet using the unique identifier of the latter packet, the file structure analyzing method including the steps of: inputting successively the plurality of distinct element packets; causing an external referrer holding section to hold temporarily the external referrer of one of the distinct element packets of which the reference destination has yet to be definitively determined; causing a unique identifier holding section to hold temporarily the unique identifier of one of the distinct element packets of which a reference source has yet to be definitively determined; and analyzing successively a reference relationship of each of the plurality of distinct element packets input in the inputting step, the analyzing step further deleting the external referrer and the unique identifier of one of the distinct element packets from the external referrer holding section and the unique identifier holding section every time the reference relationship of the distinct element packet in question is definitively determined.

According to a further embodiment of the present invention, there is provided a program including the steps of causing a computer to function as a file structure analyzing apparatus for analyzing a file including a group of structured data formed into a tree structure by having a plurality of distinct element packets referenced externally, each of the distinct element packets including a unique identifier for identifying the distinct element packet in question and an external referrer for indicating an external reference destination at which to reference externally another distinct element packet using the unique identifier of the latter packet, the computer functioning as the file structure analyzing apparatus including: a distinct element packet input section configured to input successively the plurality of distinct element packets; an external referrer holding section configured to hold temporarily the external referrer of one of the distinct element packets of which the reference destination has yet to be definitively determined; a unique identifier holding section configured to hold temporarily the unique identifier of one of the distinct element packets of which a reference source has yet to be definitively determined; and a reference relationship analysis section configured to analyze successively a reference relationship of each of the plurality of distinct element packets input to the distinct element packet input section, the reference relationship analysis section further deleting the external referrer and the unique identifier of one of the distinct element packets from the external referrer holding section and the unique identifier holding section every time the reference relationship of the distinct element packet in question is definitively determined.

The above-outlined program may illustratively cause the hardware resources of a given computer incorporating a central processing unit and a read only memory or a random access memory to function as the above-mentioned file structure analyzing apparatus having diverse features. That is, the computer running on the inventive program can function as the file structure analyzing apparatus outlined above.

According to the present invention, as explained above, it is possible to analyze the structure of a given structured file regardless of the size and complexity of the header metadata of the file in question.

BRIEF DESCRIPTION OF THE DRAWINGS

FIG. 29 is another schematic view explanatory of how the file structure analyzing method used in conjunction with the second embodiment typically works.

DETAILED DESCRIPTION OF THE PREFERRED EMBODIMENTS

Figure 1:
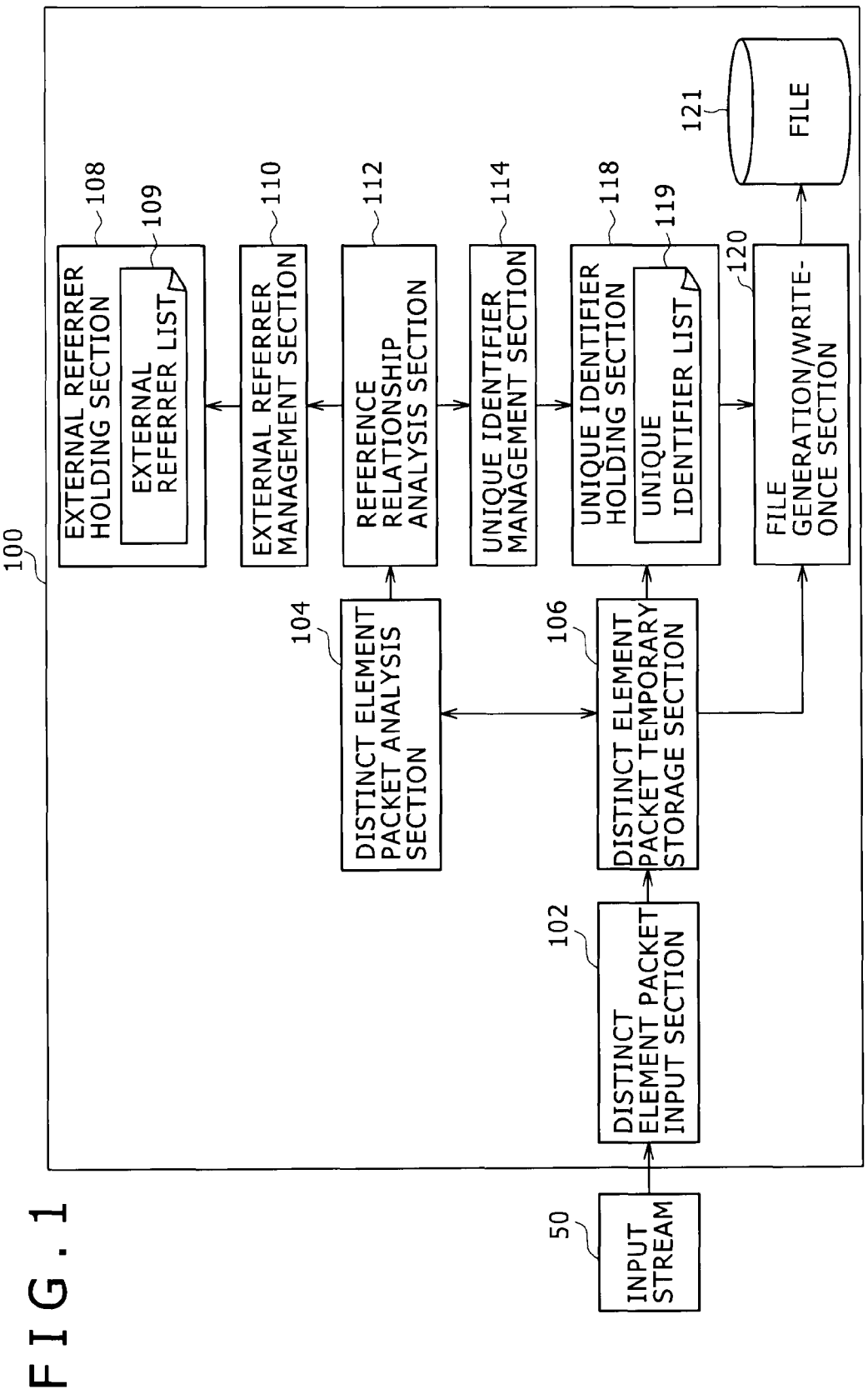
FIG. 1 is a block diagram showing a functional structure of a file structure analyzing apparatus practiced as a first embodiment of the present invention.

The preferred embodiments of the present invention will now be described in detail with reference to the accompanying drawings. Throughout the drawings and the descriptions that follow, like or corresponding parts in functional and structural terms will be designated by like reference numerals, and their explanations will be omitted where redundant.

First Embodiment

An objective of the first embodiment is explained first. Recent years have witnessed the advent of the formats adapted for file exchanges over the network, such as the MXF file format with emphasis on the interchangeability between files being exchanged. The MXF file is a structured file made up of a file header, a file body, and a file footer. Metadata may be stored into one or all of the file header, file body, and file footer as needed.

The metadata stored in the file header, called the header metadata, accommodates specifics of the structure and content of the entire file. Analyzing the header metadata thus makes it possible to verify or correct the consistency of the file in question. In the past, it was necessary to expand the header metadata all at once in an internal memory in order to analyze the tree structure of the metadata illustratively for identifying the content placed in the header metadata. It followed that in the case of huge header metadata such as large-size information typified by picture data being part of the header metadata, it was impossible to expand all header metadata collectively in the internal memory so as to analyze the tree structure involved.

It was under these circumstances that a file structure analyzing apparatus 100 was created as a first embodiment of the present invention. The file structure analyzing apparatus 100 embodying the invention is capable of analyzing file structures without regard to the size or complexity of the header metadata placed in a structured file. Below is a detailed description of how the file structure analyzing apparatus 100 is structured and how it typically works.

The file structure analyzing apparatus 100 constituting the first embodiment is structured illustratively as video equipment such as an editing device or a reproducing apparatus that is independent of an imaging device or a video recording apparatus. Alternatively, the file structure analyzing apparatus 100 may be integrated with the imaging device or video recording apparatus. In the case of the first embodiment, pictures taken by an imaging device independent of the file structure analyzing apparatus 100 are input to the apparatus 100.

Described below in reference to FIG. 1 is a typical structure of the file structure analyzing apparatus 100 making up the first embodiment. FIG. 1 is a block diagram showing a functional structure of the file structure analyzing apparatus 100 practiced as the first embodiment of the present invention. As shown in FIG. 1, the file structure analyzing apparatus 100 is composed of a distinct element packet input section 102, a distinct element packet analysis section 104, a distinct element packet temporary storage section 106, an external referrer holding section 108, an external referrer management section 110, a reference relationship analysis section 112, a unique identifier management section 114, a unique identifier holding section 118, a file generation/write-once section 120, and a file 121.

The pictures taken or recorded by a device separate from the file structure analyzing apparatus 100 as described above are input to the apparatus 100 as an input stream 50. With the first embodiment, the input stream 50 is a structured file such as an MXF file that may be expressed in a tree structure. Although the input stream 50 will be explained below as an MXF file, this is not limitative of the present invention. Alternatively, the input stream 50 may be any file as long as it is a structured file expressed in a tree structure.

Figure 2:
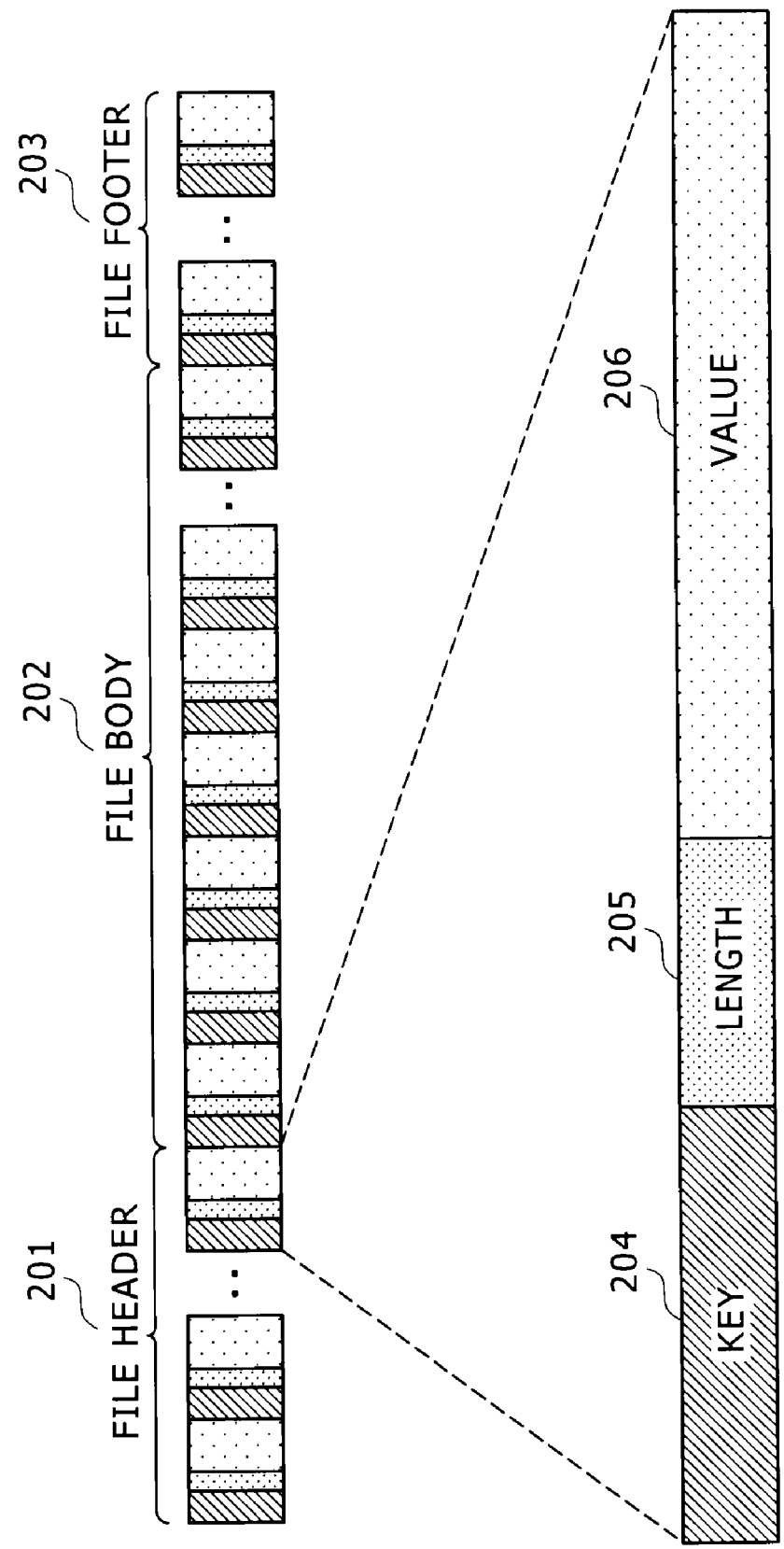
FIG. 2 is a schematic view explanatory of the file structure of an MXF file analyzed by the first embodiment.

Prior to the detailed explanation of the functional structure of the file structure analyzing apparatus 100, the data structure of the MXF file will be discussed in reference to FIGS. 2 through 7E. FIGS. 2 through 7E are schematic views explanatory of how the data in the MXF file is structured. As shown in FIG. 2, the MXF file is constituted by a file header 201, a file body 202, and a file footer 203. Located always at the beginning of the MXF file, the file header 201 contains information indicative of the start of data, as well as metadata such as information about the file structure and information about the content of real data, to be discussed later. The file body 202 accommodates one or more items of real data such as a picture item, a sound item, a system item, and a data item. The file footer 203 comes at the end of the MXF file and contains information indicative of the end of data.

The data stored in the file header 201, file body 202, and file footer 203 is coded in a KLV (Key, Length, Value) structure based on the SMPTE 336M standard. The KLV structure is a structure that has a key 204, a length field 205, and a value 206 arranged in that order from start to end. The key 204 is a tag that identifies data, indicating what kind of data is contained in the value 206. The key 204 is a 16-byte label in accordance with the SMPTE 298M standard. The length field 205 contains the length of the data placed in the value 206. The value 206 contains real data of which the length is variable.

Figure 3:
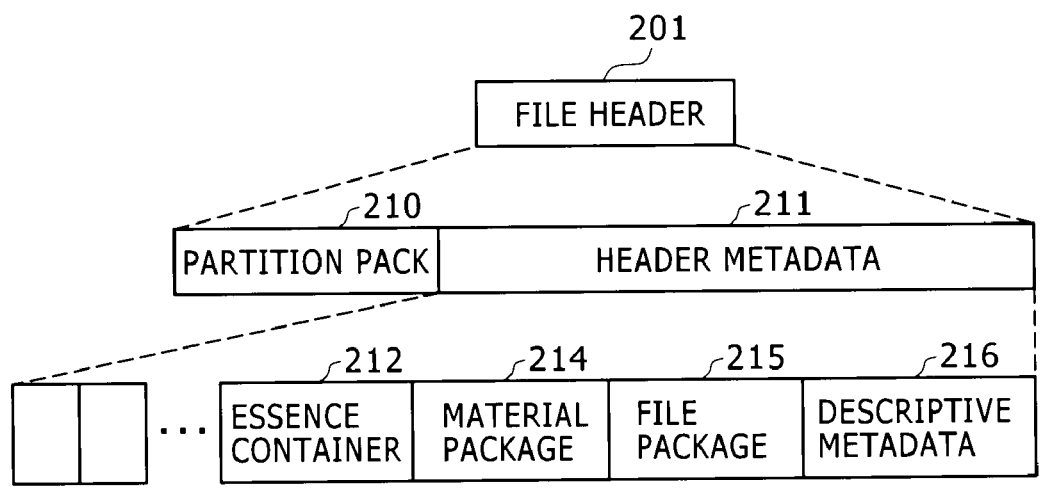
FIG. 3 is a schematic view explanatory of a data structure of a file header in the MXF file analyzed by the first embodiment.

As shown in FIG. 3, the file header 201 has a partition pack 210 and header metadata 211. The partition pack 210 contains data that identifies the header as well as information denoting the format of the data placed in the file body 202 and information indicating the file format in effect. The header metadata 211 comes in two types: structural metadata describing the file structure, and descriptive metadata describing the file content. As such, the header metadata 211 is metadata given in units of files and constituting information about file creation dates and information about the data placed in the file body 202.

The structural metadata includes an essence container 212 that denotes the type of the data in the file body 202, a material package 214 that represents output timeline information, and a file package 215 that indicates information about the material to be input. The descriptive metadata 216 is metadata that describes the content of the real data included in the file body 202. Illustratively, the descriptive metadata 216 may contain DMS-1 based on the SMPTE 380M standard.

The header metadata 211 has its structure expressed in a manner linking a plurality of metadata sets. All metadata sets are furnished with a 16-byte instance UID (Unique Identifier) each, the metadata sets cross-referencing their UID's in a link structure. Analyzing the linked state between the metadata sets makes it possible to analyze the tree structure of the MXF file.

Figure 4:
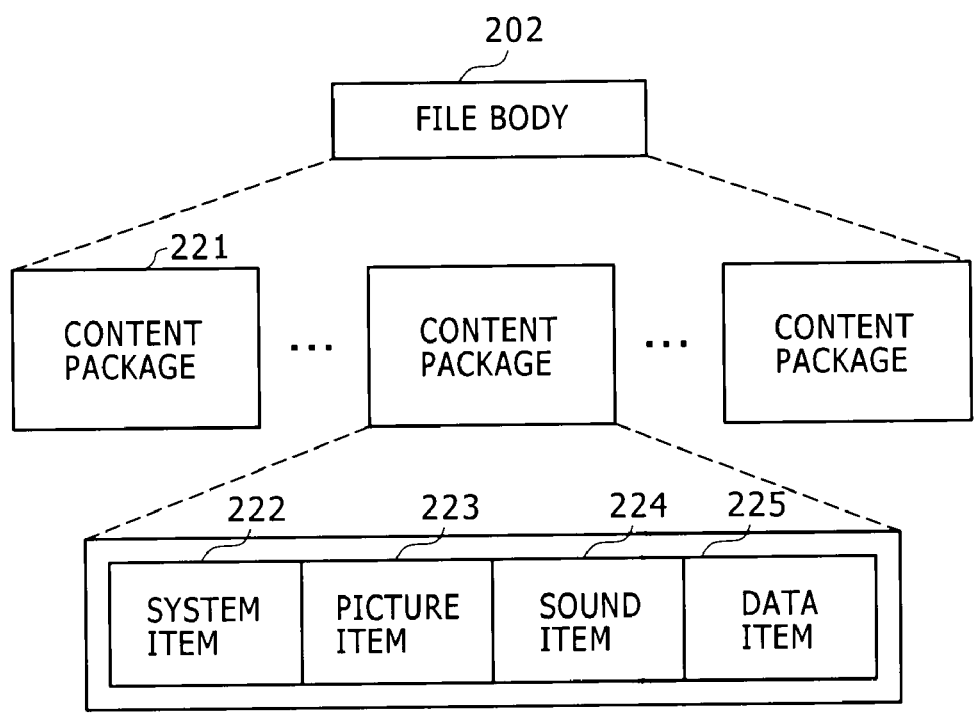
FIG. 4 is a schematic view explanatory of a data structure of a file body in the MXF file analyzed by the first embodiment.

As shown in FIG. 4, the file body 202 is made up of a plurality of content packages 221 each including one or more items of real data such as a system item 222, a picture item 223, a sound item 224, and a data item 225.

What follows is a detailed description of the descriptive metadata (abbreviated as the DM hereunder). With the first embodiment, analyzing the linked state of the DM makes it possible to analyze the tree structure of the MXF file. A typical DM scheme DMS-1 (Descriptive Metadata Scheme-1) defined by the SMPTE 380M provides three frameworks: production framework, scene framework, and clip framework. The production framework is a framework in which the identification and proprietorship of a given content are described as detail information and which covers the entire content in question. The scene framework is used to describe information about the actions and events included in individual scenes of the content, whereby continuous parts of the content are described. The clip framework is for describing information about the picture-taking and production of individual clips.

Figure 5:
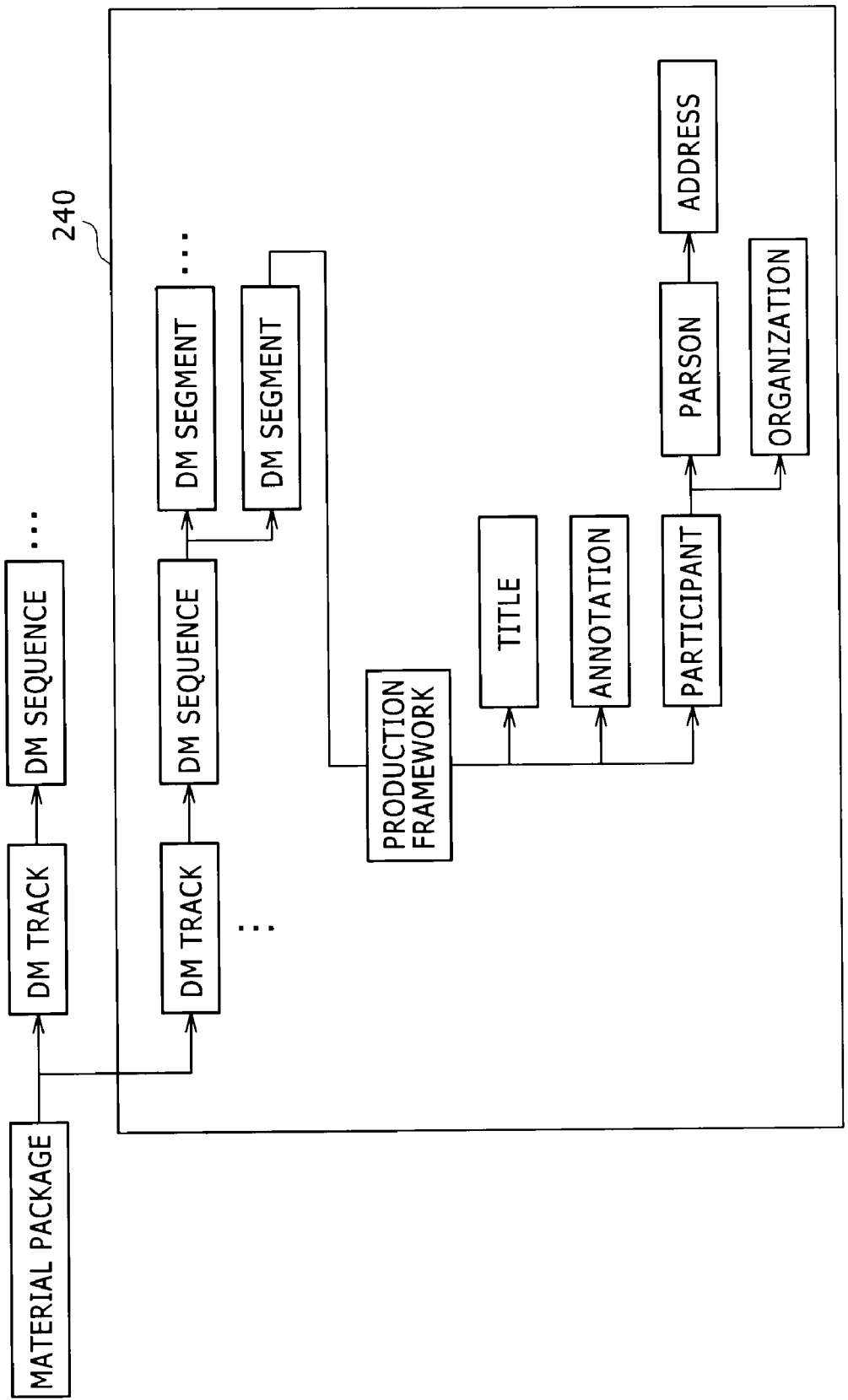
FIG. 5 is a schematic view explanatory of a typical DM instance based on a production framework of the MXF file analyzed by the first embodiment.

FIG. 5 is a schematic view explanatory of a typical DM instance based on the production framework. As shown in FIG. 5, a material package 214 includes a plurality of DM tracks. One of the DM tracks serves as a root under which a tree structure is built. Each DM track has one DM sequence which in turn has a plurality of DM segments. The real data of the DM instance based on the production framework is generated when referenced externally from the DM segments.

Below is an explanation of how distinct element packets making up the tree structure are referenced. Illustratively, each DM track externally references the corresponding DM sequence as shown in FIG. 5. More specifically, a unique identifier retained by the DM sequence is referenced externally by an external referrer furnished in the DM track. Likewise, the unique identifier of each of the DM segments is externally referenced by the external referrer of the DM sequence. That is, each of the distinct element packets making up the tree structure has a unique identifier that is referenced by an external referrer furnished in another distinct element packet, whereby the relationship between a reference destination and a reference source can be expressed. The foregoing description has been about the data structure of the MXF file.

Figure 6:
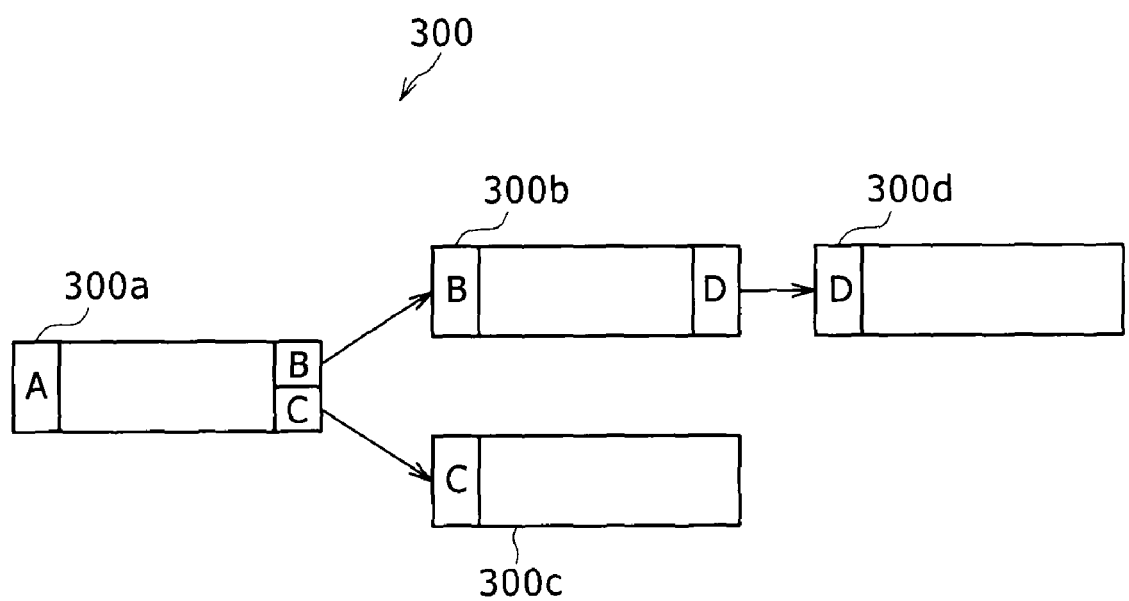
FIG. 6 is a schematic view explanatory of different types of distinct element packets constituting a tree structure.

Returning to FIG. 1, a structured file such as an MXF file is input to the file structure analyzing apparatus 100 as the input stream 50. The input stream 50 is illustratively constituted by a plurality of packets 300 in a tree structure as shown in FIG. 6. The distinct element packet input section 102 accepts the input stream 50 in the order in which its distinct element packets are input successively. The distinct element packets thus input are forwarded to the distinct element packet temporary storage section 106.

The distinct element packet temporary storage section 106 is capable of temporarily storing the distinct element packets provided by the distinct element packet input section 102. Typically, the distinct element packet temporary storage section 106 may be formed by a nonvolatile memory such as EEPROM (Electrically Erasable Programmable Read-Only Memory) or EPROM (Erasable Programmable Read-Only Memory); a magnetic disk such as a hard disk or a diskette; an optical disk such as CD-RW (Compact Disc Rewritable), DVD (Digital Versatile Disc)-RW/+RW/RAM (Random Access Memory), or BD (Blu-ray Disc (registered trademark)); or MO (Magneto Optical) disk.

The distinct element packet analysis section 104 extracts the unique identifier (called the packet ID or simply the ID where appropriate) identifying the distinct element packet being input or the external referrer included in the distinct element packet. When a given distinct element packet externally references another distinct element packet, the former distinct element packet uses the unique identifier of the latter distinct element packet as the external referrer pointing to the external reference destination. The distinct element packet analysis section 104 supplies the reference relationship analysis section 112 with the result of the analysis of each distinct element packet.

The reference relationship analysis section 112 analyzes the reference relationship of the distinct element packet held by the distinct element packet temporary storage section 106. The distinct element packet analysis section 104 analyzes the reference relationship of each distinct element packet, supplies the unique identifier management section 114 with the unique identifier of the distinct element packet whose reference relationship has yet to be definitively determined, and orders the unique identifier management section 114 temporarily to put the unique identifier of the undetermined distinct element packet on a unique identifier list. If the distinct element packet of interest includes an external referrer whose reference relationship has yet to be definitively determined, then the reference relationship analysis section 112 sends the undetermined external referrer to the external referrer management section 110 and orders the section 110 temporarily to put the external referrer in question on an external referrer list. That a reference relationship is definitively determined means one of two things: either the external referrer referencing the extracted unique identifier is found on the external referrer list, or the unique identifier referenced by the extracted external referrer is found on the unique identifier list.

When the reference relationship of a given distinct element packet is definitively determined, the unique identifier of the distinct element packet whose external reference source has been determined is deleted from the unique identifier list. When the external reference destination is determined, the corresponding external referrer is deleted from the external referrer list.

As shown in FIG. 6, the distinct element packets making up the tree structure include a root element 300a, a node element 300b, and leaf elements 300c and 300d. The root element 300a is a distinct element packet which possesses a unique identifier not referenced externally or which retains not a unique identifier but an external referrer only. A given distinct element packet may be determined in some other way as the root element by appropriate systems or schemes for analyzing tree structures. The node element retains a unique identifier to be externally referenced and an external referrer. The leaf element possesses a unique identifier to be externally referenced and has no external referrer. The input distinct element packets may include an isolated element packet which has a unique identifier not externally referenced and which does not possess an external referrer of its own.

Figure 7A:
FIGS. 7A, 7B, 7C, 7D and 7E are schematic views explanatory of the distinct element packets to be detected as a tree structure error each.

Returning again to FIG. 1, the reference relationship analysis section 112 detects tree structure errors shown in FIGS. 7A through 7E. Illustratively, the distinct element packets to be detected as tree structure errors may include an isolated element packet in FIG. 7A, a dangling hook (i.e., external referrer whose reference destination has yet to be definitively determined) in FIG. 7B, loop references in FIGS. 7C and 7D, and a duplicate reference in FIG. 7E. The isolated element packet, as shown in FIG. 7A, is a distinct element packet which does not have its own unique identifier referenced externally or which does not retain the external referrer of its own. Although this distinct element packet is not an error, it needs to be extracted as an isolated element packet because it does not make up any part of the tree structure.

Figure 7B:
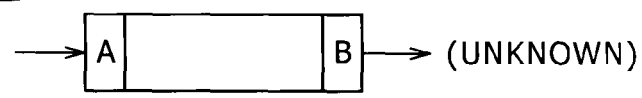
Figure 7C:
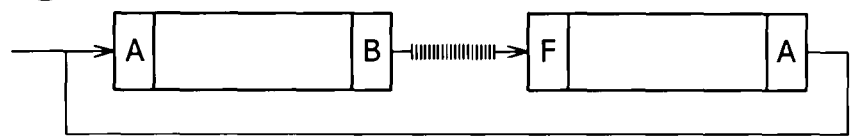
Figure 7D:
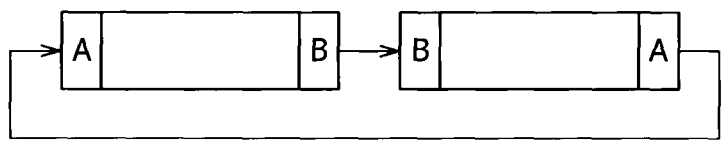
Figure 7E:
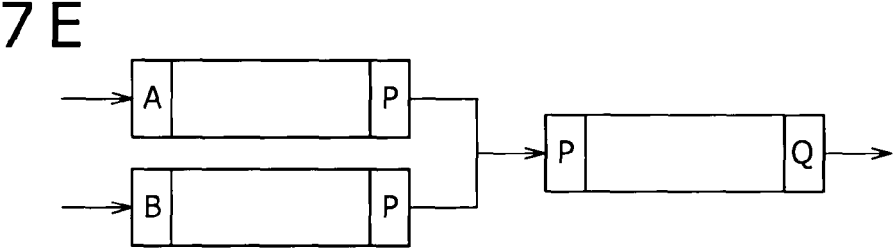

The dangling hook, as shown in FIG. 7B, is a distinct element packet that has an external referrer pointing to a nonexistent external reference destination. The loop reference, as depicted in FIGS. 7C and 7D, applies to cases where the external referrer of a low-order node references the unique identifier of a high-order node. The duplicate reference, as illustrated in FIG. 7E, is a case in which the unique identifier is referenced by a plurality of external referrers.

Returning to FIG. 1, the external referrer management section 110 under instructions from the reference relationship analysis section 112 causes the external referrer holding section 108 temporarily to put the external referrer furnished by the reference relationship analysis section 112 on an external referrer list 109. Also under the direction of the reference relationship analysis section 112, the external referrer management section 110 deletes from the external referrer list 109 the external referrer whose external reference destination has been definitively determined.

The external referrer holding section 108 is in possession of the external referrer list 109 in which to hold temporarily the external referrers of the distinct element packets whose reference destinations have yet to be definitively determined. As described above, the external referrer holding section 108 under the direction of the external referrer management section 110 puts external referrers temporarily on the external referrer list 109 or deletes external referrers from the list 109. If an external referrer held on the external referrer list 109 is found to the same as the unique identifier of the input distinct element packet, that external referrer is deleted from the list 109 as the definitively determined reference source of the input packet. Because the reference relationship is analyzed every time a distinct element packet is input, there is no need to expand the external referrers of all input distinct element packets collectively in the external reference list 109.

The unique identifier management section 114 under instructions from the reference relationship analysis section 112 causes the unique identifier holding section 118 temporarily to put the unique identifier supplied by the section 112 on a unique identifier list 119. Under the direction of the reference relationship analysis section 112, the unique identifier management section 114 deletes from the unique identifier list 119 the unique identifier of the distinct element packet of which the external reference source has been definitively determined.

The unique identifier holding section 118 retains the unique identifier list 119 on which to hold temporarily the unique identifiers of the distinct element packets whose reference sources have yet to be definitively determined. Under the direction of the unique identifier management section 114, as described above, the unique identifier holding section 118 puts unique identifiers temporarily on the unique identifier list 119 or deletes unique identifiers from the list 119. If a unique identifier held on the unique identifier list 119 is found to be the same as the external referrer of the input distinct element packet, that unique identifier is deleted from the list 119 as the definitively determined reference destination of the input packet. Because the reference relationship is analyzed every time a distinct element packet is input, there is no need to expand the unique identifiers of all input distinct element packets collectively in the unique identifier list 119.

The file generation/write-once section 120 is capable of generating a file 121 and writing to the file 121 the distinct element packet of which the reference relationship has been definitively determined. More specifically, the file generation/write-once section 120 acquires from the distinct element packet temporary storage section 106 the distinct element packet retaining the unique identifier deleted from the unique identifier list 119, and writes the acquired distinct element packet to the file 121.

The file 121 has the capability to store the distinct element packets whose reference relationships have been definitively determined. The file 121 is a typical distinct element packet according to an embodiment of the present invention. Illustratively, the file 121 may be formed by a nonvolatile memory such as EEPROM (Electrically Erasable Programmable Read-Only Memory) or EPROM (Erasable Programmable Read-Only Memory); a magnetic disk such as a hard disk or a diskette; an optical disk such as CD-R (Compact Disc Recordable)/RW (Rewritable), DVD-R (Digital Versatile Disc Recordable)/RW/+R/+RW/RAM (Random Access Memory), or BD (Blu-ray Disc (registered trademark)); or MO (Magneto Optical) disk.

Although the first embodiment involves having the file structure analyzing apparatus 100 furnished with the file generation/write-once section 120 and file 121, this is not limitative of the present invention. Alternatively, the file generation/write-once section 120 and file 121 may be structured as devices separate from the file structure analyzing apparatus 100. The foregoing description has been about the functional structure of the file structure analyzing apparatus 100. What follows is a description of a file structure analyzing method for use in conjunction with the file structure analyzing apparatus 100.

Figure 8:
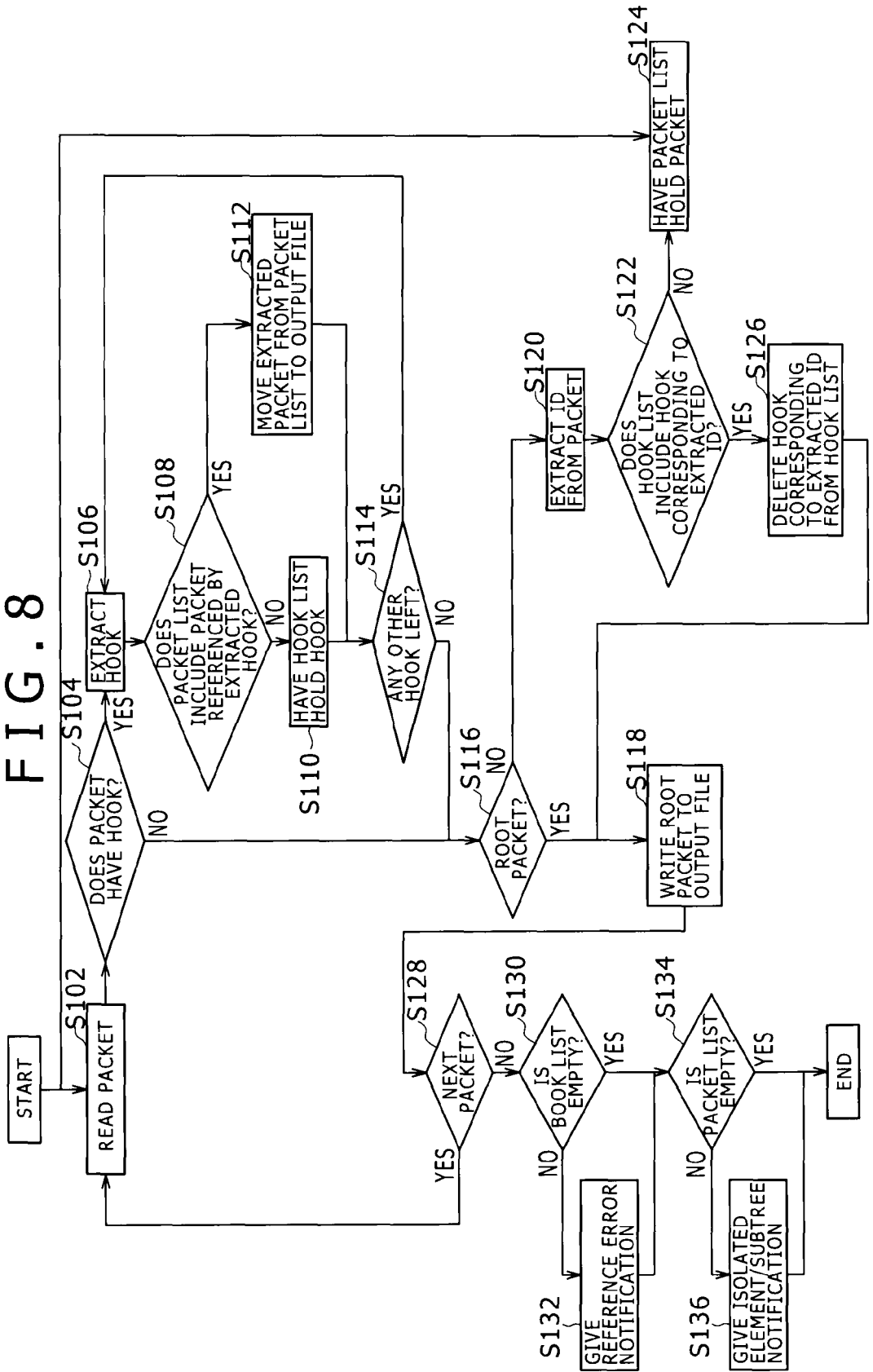
FIG. 8 is a flowchart of steps constituting a file structure analyzing method for use in conjunction with the first embodiment.

FIG. 8 is a flowchart of steps constituting a file structure analyzing method for use in conjunction with the file structure analyzing apparatus 100 as the first embodiment. The file structure analyzing method is described below by referring, as needed, to FIGS. 9 through 15. These drawings are schematic views explanatory of how the inventive file structure analyzing method typically works. In the ensuing description, the distinct element packet will be simply referred to as a packet, the unique identifier as an ID, the unique identifier list as a packet list, the external referrer as a hook, and the external referrer list as a hook list. An output file to be mentioned below is a file that is recorded to the file 121.

As shown in FIG. 8, a packet is first read out in step S102. A check is made in step S104 to determine whether or not the packet read out in step S102 has a hook. If the packet read out in step S104 is found to have a hook, then step S106 is reached and the hook is extracted. In step S108, a check is made to determine whether or not the packet list retains the packet referenced by the hook extracted in step S106. That is, the check in step S108 involves determining whether or not the packet list holds the ID corresponding to the hook extracted in step S106.

Figure 9:
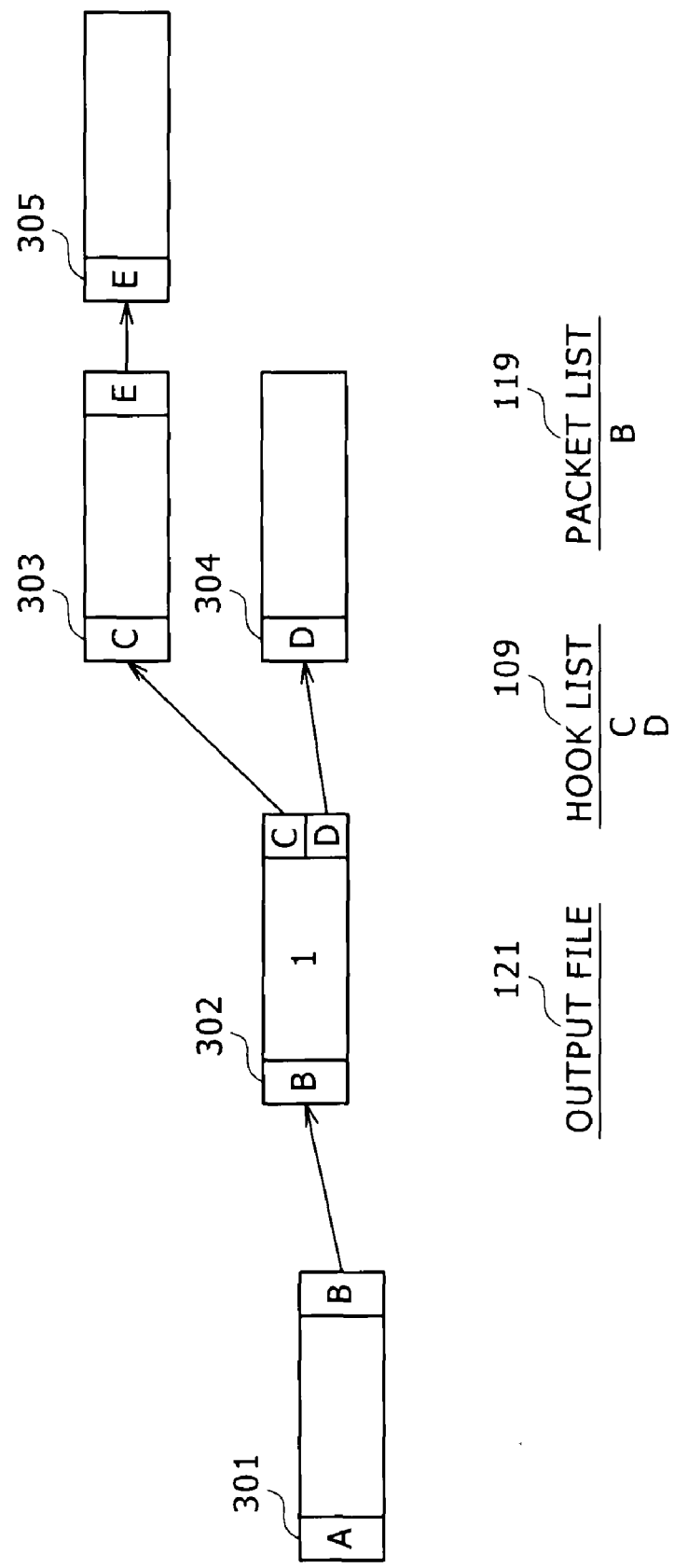
FIG. 9 is a schematic view explanatory of how the file structure analyzing method used in conjunction with the first embodiment typically works.

If in step S108 the packet list does not hold any ID corresponding to the hook in question, then step S110 is reached and the hook is written to the hook list. If the read-out packet has another hook, then steps S106 through S114 are repeated. Illustratively, as shown in FIG. 9, a packet 302 is first read, hooks C and D are extracted from the packet 302, and the hooks C and D are written to the hook list 109.

Returning to FIG. 8, a check is made in step S116 to determine whether or not the input packet is the root packet. Whether or not the input packet is the root packet is determined illustratively by checking to see if the ID of the packet is not externally referenced or if there is no ID and only a hook is furnished. The root packet may also be determined in some other manner by suitable systems or schemes for analyzing tree structures.

If in step S116 the packet is not found to be the rook packet, then step S120 is reached and the ID of the packet is extracted. In step S122, a check is made to determine whether or not the hook list holds the hook corresponding to the packet ID extracted in step S120. If in step S122 the hook list is not found to retain the hook corresponding to the packet ID, then step S124 is reached and the packet in question is placed in the packet list. Because the packet 302 read out first is not the root packet as shown in FIG. 9, the packet ID "B" is placed in the packet list 119.

Figure 10:
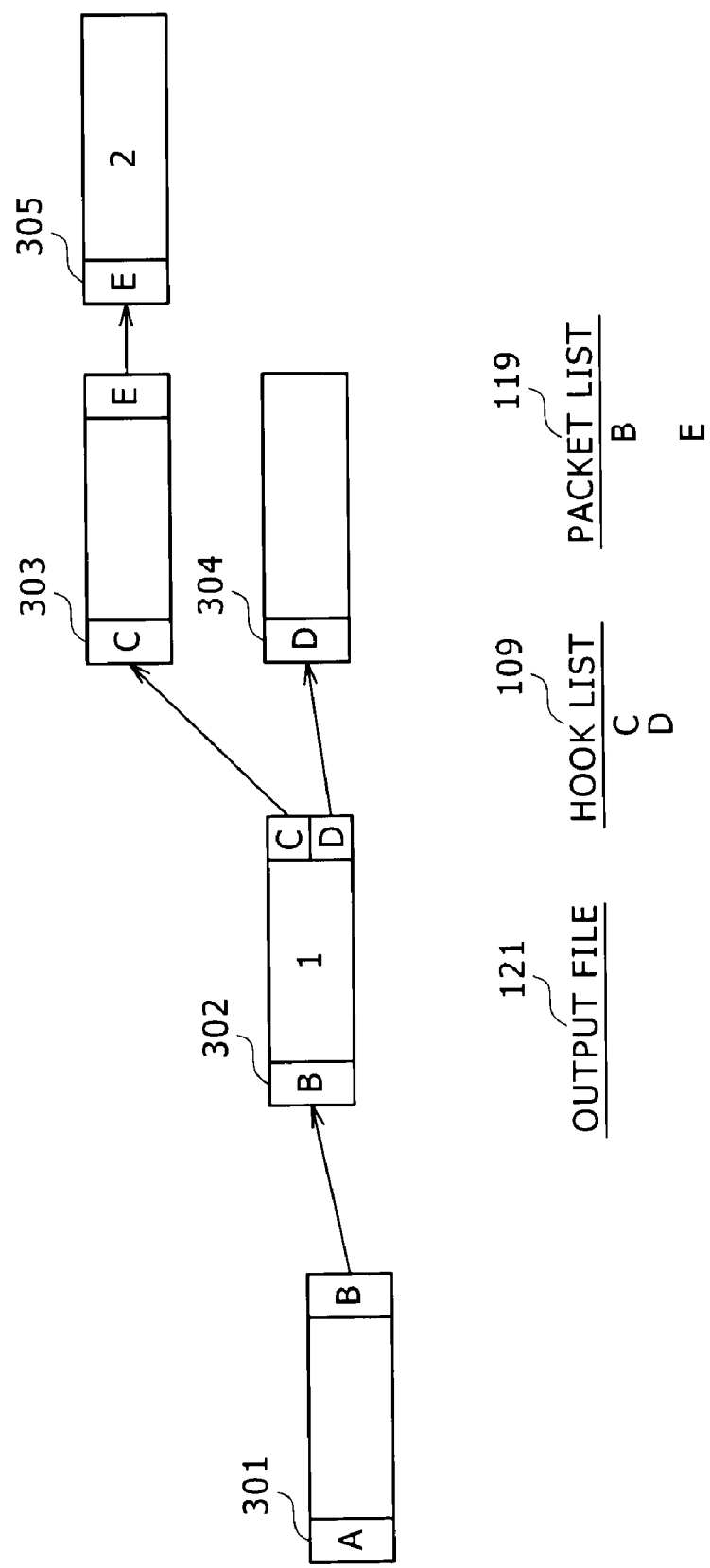
FIG. 10 is another schematic view explanatory of how the file structure analyzing method used in conjunction with the first embodiment typically works.

Described below in reference to FIGS. 8 and 10 is what takes places when a second packet 305 is read out. In step S102, the second packet is read out. When the packet 305 read out second is found to have no hook in step S104 of FIG. 8, step S116 is reached. When the packet 305 is not found to be the root packet in step S116, and step S120 is reached and the packet ID "E" is extracted. When the ID "E" extracted in step S120 is not found to exist in the hook list 109 in step S122, step S124 is reached and the ID "E" of the packet 305 is placed in the packet list 119.

Figure 11:
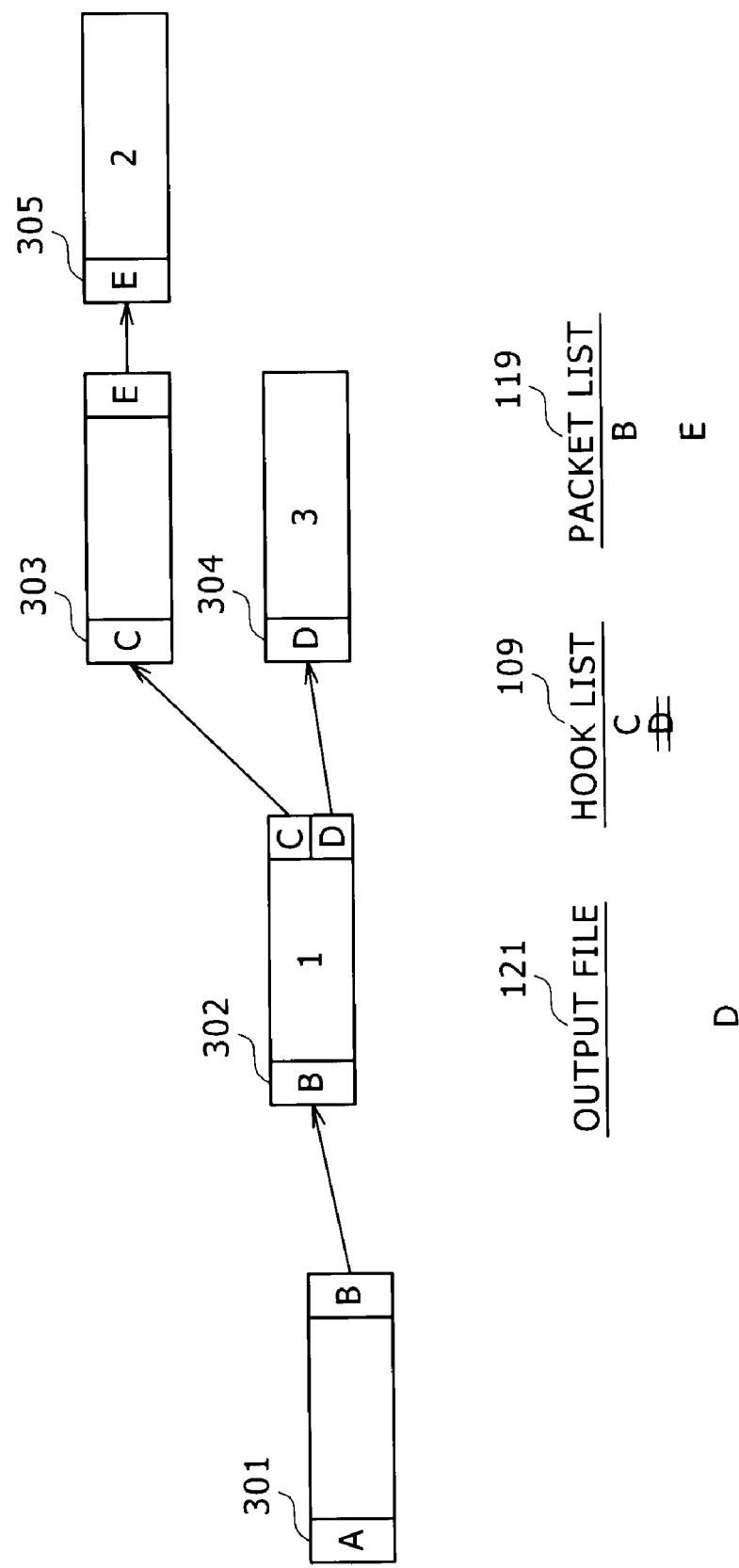
FIG. 11 is another schematic view explanatory of how the file structure analyzing method used in conjunction with the first embodiment typically works.

Described below in reference to FIGS. 8 and 11 is what takes places when a third packet 304 is read out. As with the packet 305 read out second, the packet 304 is found to have no hook in step S104. When the packet 304 is not found to be the root packet in step S116, the ID "D" of the packet 304 is extracted in step S120. In step S122, a check is made to determine whether or not the hook corresponding to the ID "D" extracted in step S120 is listed in the hook list 109.

The hook list 109 retains the hook "D" of the packet 302 that was read out first. Thus in step S122 the hook corresponding to the ID "D" of the packet 304 is found to exist in the hook list 109. Step S122 is followed by step S126 in which the hook "D" is deleted from the hook list. This definitively determines the reference source of the packet 304, so that the packet 304 is added to the output file 121 in step S118. In step S128, a check is made to determine whether there is any other packet. If the next packet is found to exist in step S128, then step S102 is reached and that packet is read out.

Figure 12:
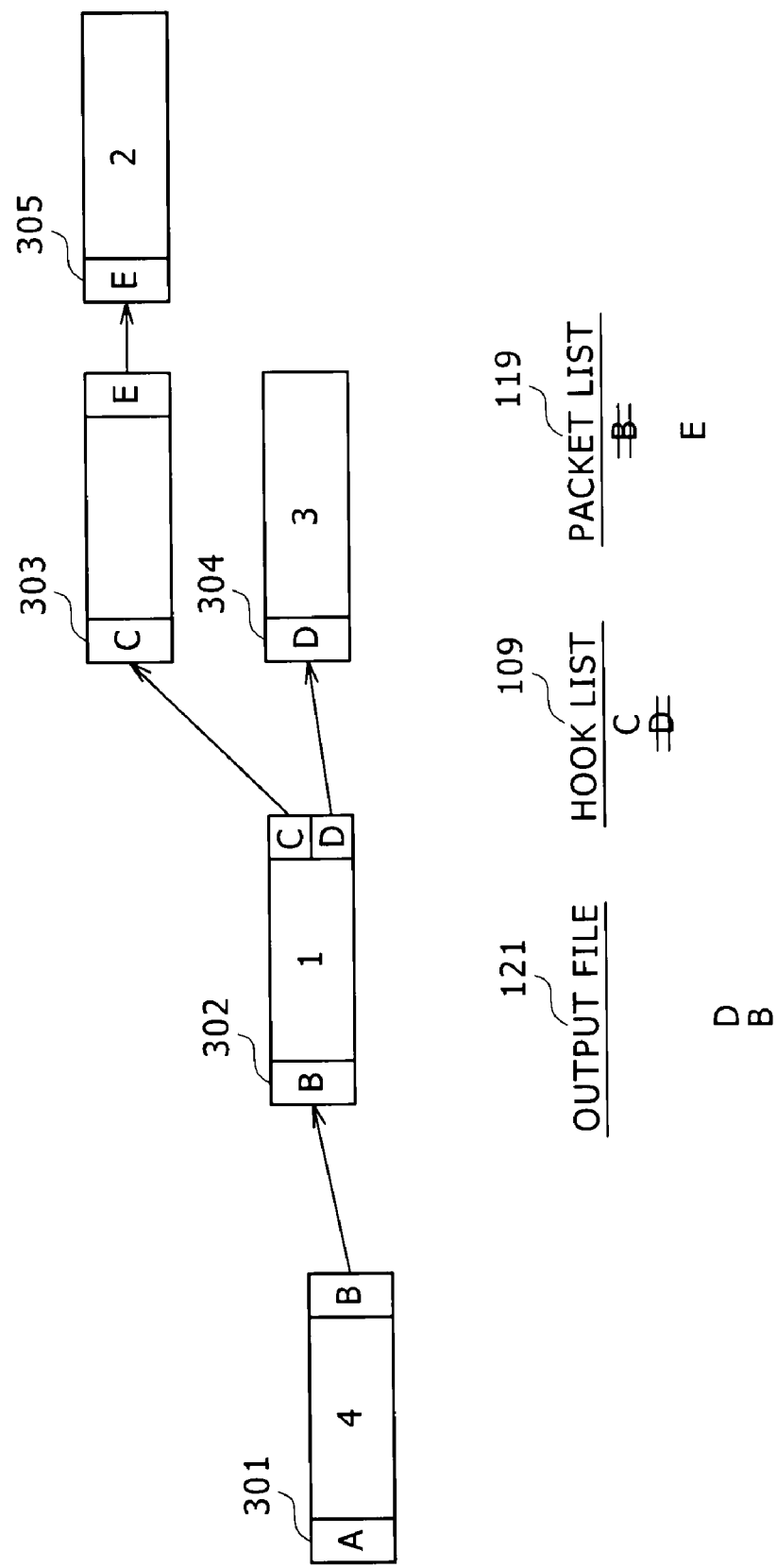
FIG. 12 is another schematic view explanatory of how the file structure analyzing method used in conjunction with the first embodiment typically works.
Figure 13:
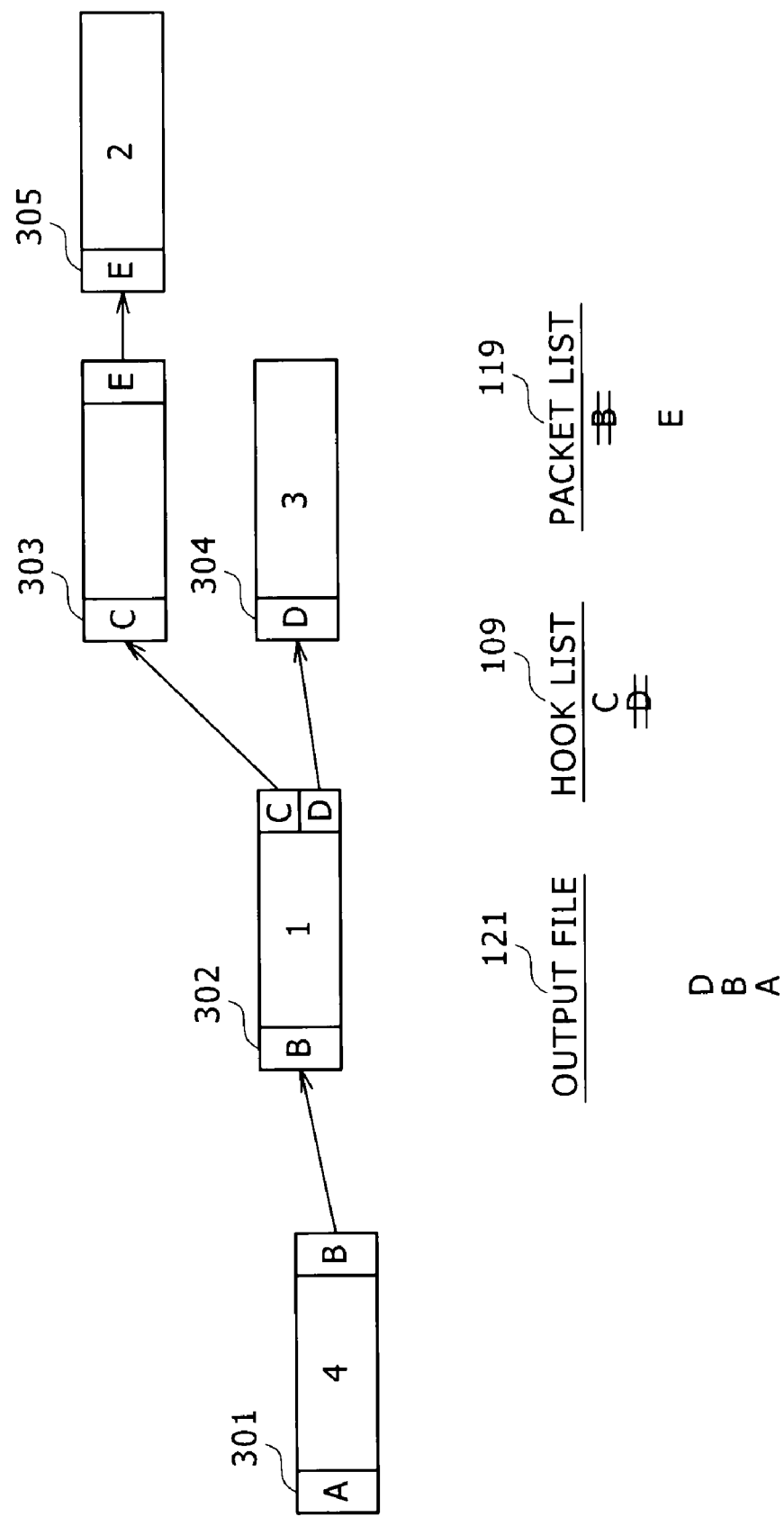
FIG. 13 is another schematic view explanatory of how the file structure analyzing method used in conjunction with the first embodiment typically works.

Described below in reference to FIGS. 8, 12 and 13 is what takes places when a fourth packet 301 is read out. In step S104, a check is made to determine whether or not the packet 301 has a hook. When the packet 301 is found to have a hook "B" in step S104, step S106 is reached and the hook "B" of the packet 301 is extracted. In step S108, a check is made to determine whether or not the hook "Be" extracted in step S106 is listed in the packet list 119. When the hook "B" is the same as the ID "B" of the packet 302 held in the packet list 119, that means the reference destination of the packet 301 is definitively determined. The packet with the ID "B" is then retrieved from the packet list 119 and added to the output file 121 in step S112.

If in step S114 the packet 301 is found to have no other hook than the hook "B," then step S116 is reached and a check is made to see if the packet 301 is the root packet. When the packet 301 is found to be the root packet in step S116, step S118 is reached and the packet 301 (with the ID "A") is added to the output file. If any other packet is found to exist in step S128, that packet is read out in step S102.

Figure 14:
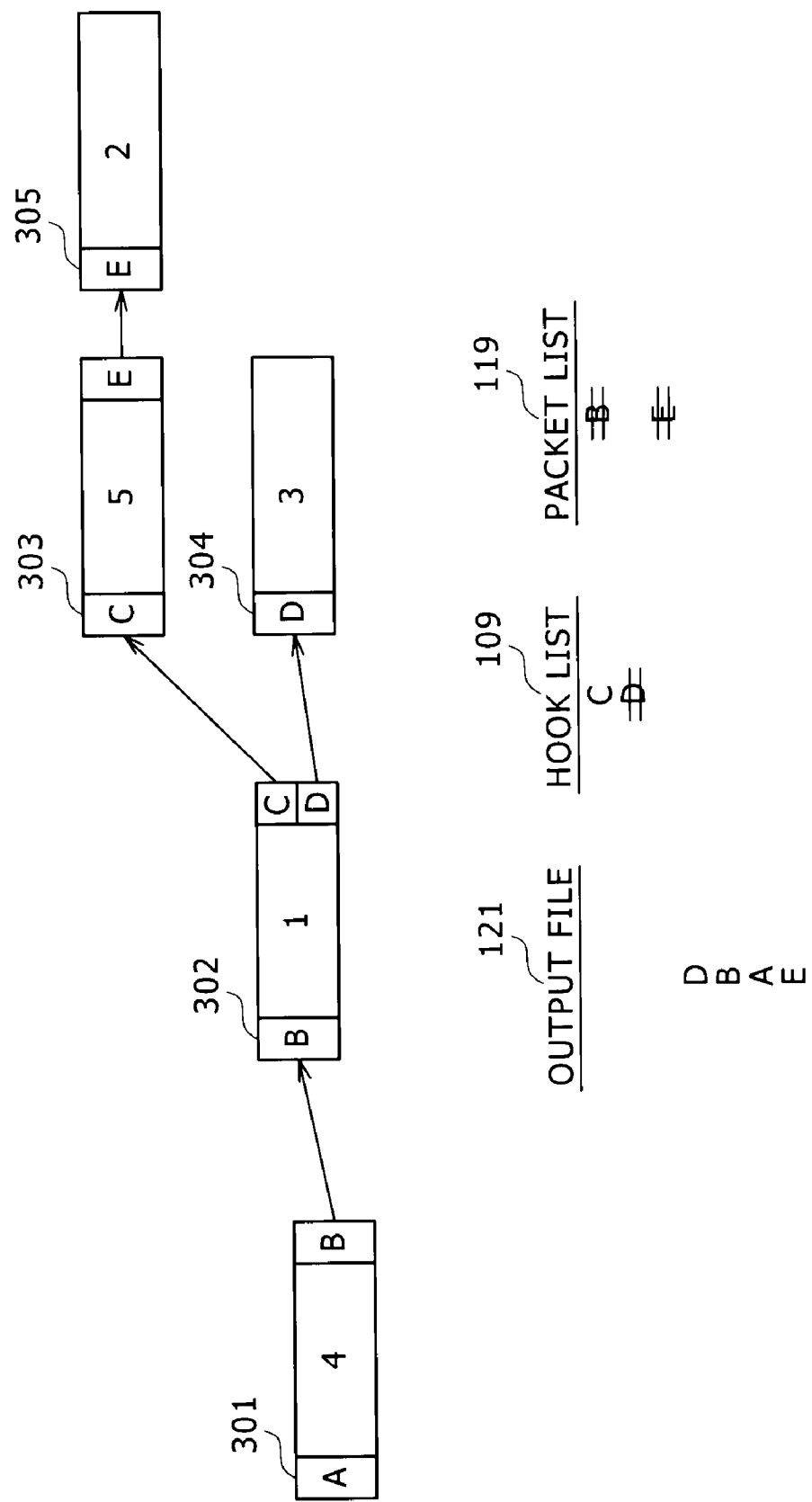
FIG. 14 is another schematic view explanatory of how the file structure analyzing method used in conjunction with the first embodiment typically works.
Figure 15:
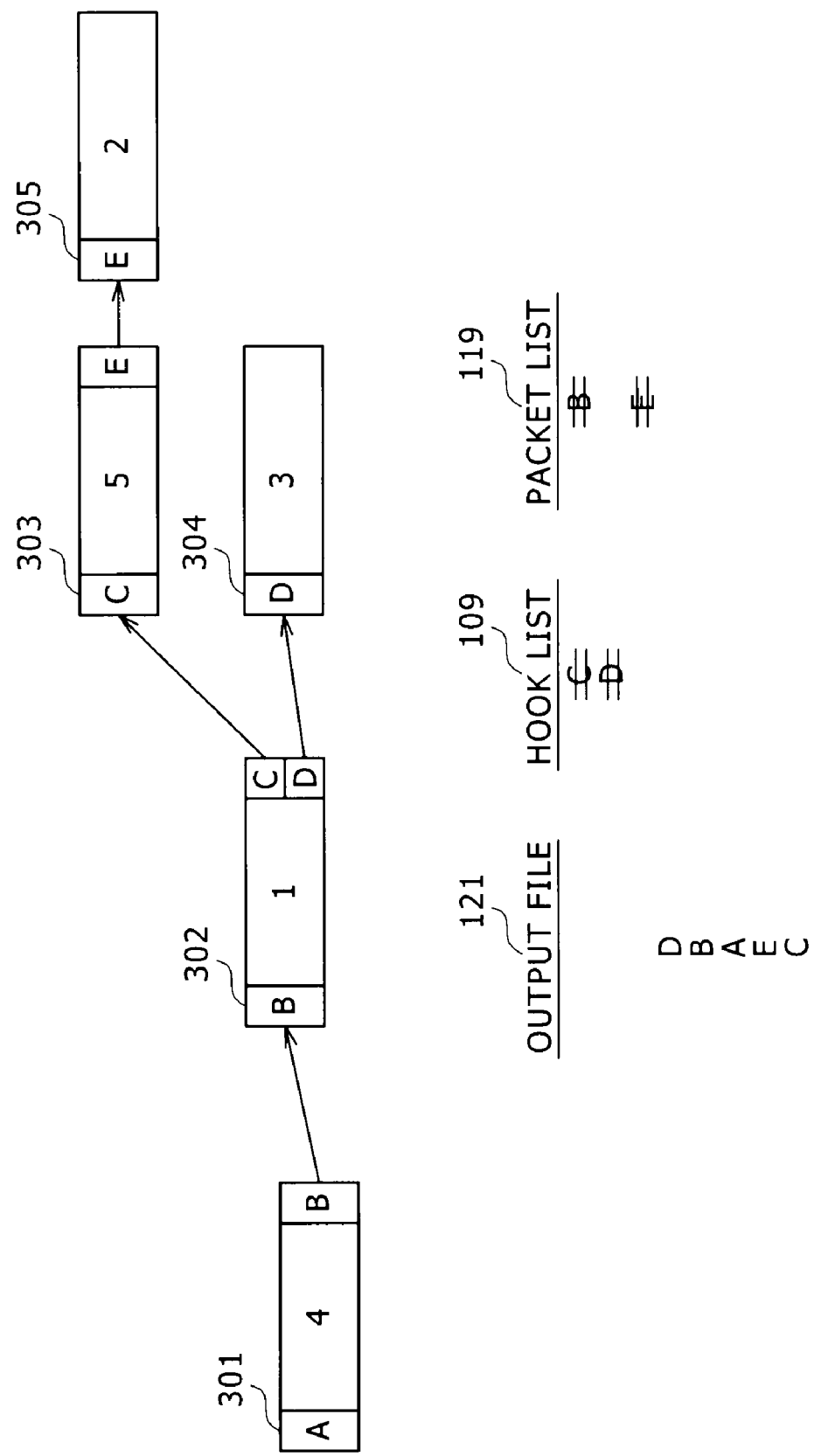
FIG. 15 is another schematic view explanatory of how the file structure analyzing method used in conjunction with the first embodiment typically works.

Lastly described below in reference to FIGS. 8, 14 and 15 is what takes places when a fifth packet 303 is read out. In step S104, a check is made to see if the packet 303 has a hook. When the packet 303 is found to have a hook "E" in step S104, that hook is extracted in step S106. In step S108, a check is made to see whether or not the hook "E" extracted in step S106 is retained in the packet list 119. When the hook "E" is found to be the same as the ID "E" of the packet 305 listed in the packet list 119, which means the reference destination of the packet 303 is definitively determined. The packet with the ID "E" is then retrieved from the packet list 119 and added to the output file 121 in step S122.

If in step S114 the packet 303 is found to have no other hook than the hook "E," then step S116 is reached and a check is made to determine whether or not the packet 303 is the root packet. When the packet 303 is not found to be the root packet in step S116, step S120 is reached and the ID "C" of the packet 303 is extracted. In step S122, a check is made to determine whether the hook corresponding to the ID "C" extracted in step S120 is retained in the hook list 109. If in step S122 the hook corresponding to the ID "C" is found to exist in the hook list 109, then the corresponding hook is deleted from the hook list in step S126.

When the hook "C" corresponding to the ID "C" is found to exist in the hook list 109 as shown in FIG. 15, the hook "C" is deleted from the hook list 109 in step S126. This definitively determines the reference source of the packet 303, so that the packet 303 is added to the output file 121 in step S118. If no more packet is found to exist in step S128, then step S130 is reached and a check is made to determine whether or not the hook list is empty. If in step S130 the hook list is not found empty, which means the reference relationship is not definitively determined. In that case, step S132 is reached and a reference error notification is made.

In step S134, a check is made to determine whether or not the packet list is empty. If in step S134 the packet list is not found empty, then notification is made that an isolated element packet or a subtree is recognized in S136. The foregoing description has been about the file structure analyzing method used in conjunction with the first embodiment.

According to the file structure analyzing apparatus 100 of the first embodiment, a plurality of distinct element packets are input one by one. The external referrers of the distinct element packets whose reference destinations have yet to be definitively determined are temporarily held in the external referrer list 109 of the external referrer holding section 108. The unique identifiers of the distinct element packets whose reference sources have yet to be determined are temporarily retained in the unique identifier list 119 of the unique identifier holding section 118. The reference relationships of the input distinct element packets are analyzed one by one. Every time the reference relationship of a given distinct element packet is definitively determined, the external referrer and unique identifier of the determined packet are deleted from the external referrer list 109 and unique identifier list 119, respectively.

Where the inventive file structure analyzing apparatus 100 is used to analyze the tree structure of an input file, there is no need to expand all of the external referrers and unique identifiers included in the file collectively in the external referrer holding section 108 and unique identifier holding section 118. Illustratively, when the file is composed of five distinct element packets as shown in FIGS. 9 through 15, the external referrer list 109 and unique identifier list 119 need only accommodate a maximum of about two referrers or identifiers each. When the reference relationships in the tree structure inside a structured file are analyzed one at a time, it is possible to analyze the file structure even if the size of the header metadata of the file is very large or the structure of the header metadata is complicated.

As described above, if the packet list is not found empty upon completion of the analyses of all packets, the first embodiment makes it possible to identify isolated packets or to definitively determine the highest-order packet of the subtree. If the hook list is not found empty, it is possible to detect a dangling hook pointing to a nonexistent external reference destination or cases of duplicate reference destination as an error each.

Second Embodiment

Figure 16A:
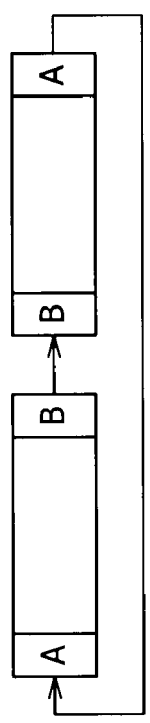
FIGS. 16A, 16B and 16C are schematic views explanatory of a loop error detecting method for use in conjunction with another file structure analyzing apparatus practiced as a second embodiment of the present invention.

In the case of the first embodiment described above, it is impossible to detect a simple loop error such as one shown in FIG. 16A unless the root element is definitively determined somehow. Since the above-mentioned MXF file is structured in such a manner that its root element can be definitively determined by any one of the systems for analyzing tree structures, the simple loop error of FIG. 16A can be detected by the first embodiment with no problem. However, there may be input data of which the root element cannot be definitively determined by a file structure analyzing apparatus for analyzing groups of data in generalized tree structures. In that case, the simple loop error such as one in FIG. 16A cannot be detected and file structure analysis cannot be accomplished correctly. This bottleneck is bypassed by a second embodiment of the present invention. The second embodiment abstracts those portions of a tree structure which have been definitively determined as a plurality of packets, and synthesizes these packets into a composite packet. If the composite packet is found to reference itself, then the second embodiment recognizes a simple loop error.

Figure 16B:
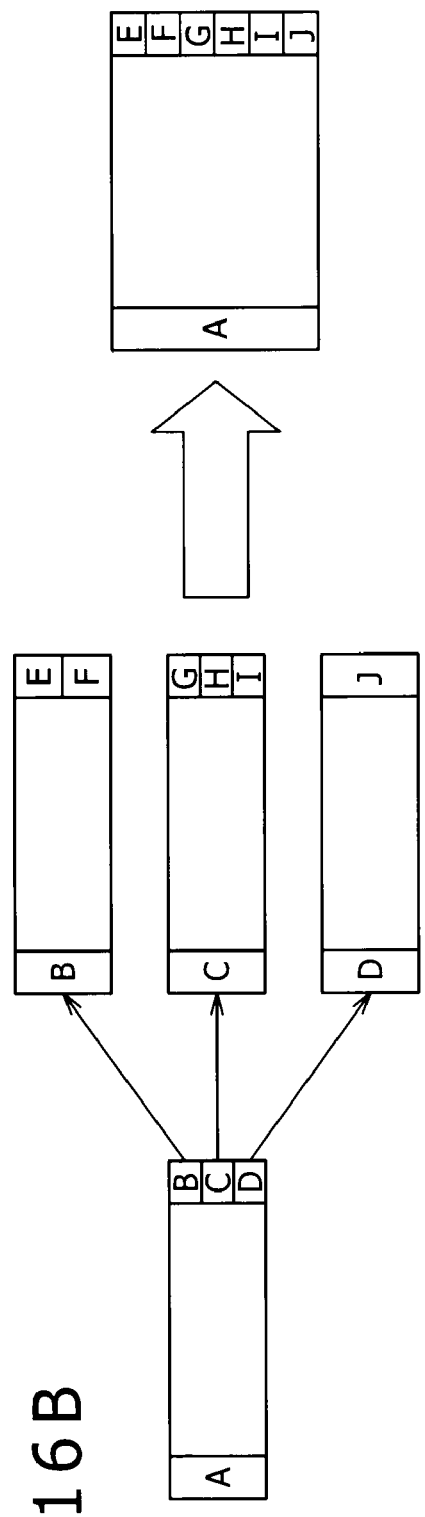
Figure 16C:
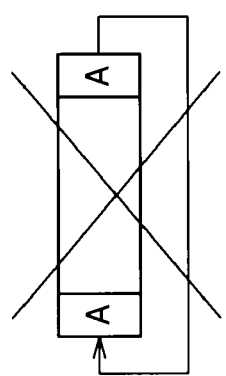

FIG. 16B is a schematic view explanatory of how those portions of multiple distinct element packets which have been definitively determined are abstracted and turned into a plurality of packets which in turn are synthesized into a composite packet. As shown in FIG. 16B, packets A, B, C and D are synthesized into a composite packet having hooks "E" through "J" and an effective ID "A." That is, the effective ID of the composite packet becomes the unique identifier of the effective distinct element packets. FIG. 16C is a schematic view explanatory of how a composite packet derived from distinct element packets is referencing itself in a simple loop error.

The second embodiment is practiced in the form of a file structure analyzing apparatus 100' supplemented by processes for detecting the above-mentioned simple loop error. The file structure analyzing apparatus 100' can thus perform file structure analysis correctly upon input of a group of data in a general tree structure of which the root element has yet to be definitively determined. The functional structure of the file structure analyzing apparatus 100' is substantially the same as that of the file structure analyzing apparatus 100 constituting the first embodiment and thus will not be discussed further.

Figure 17:
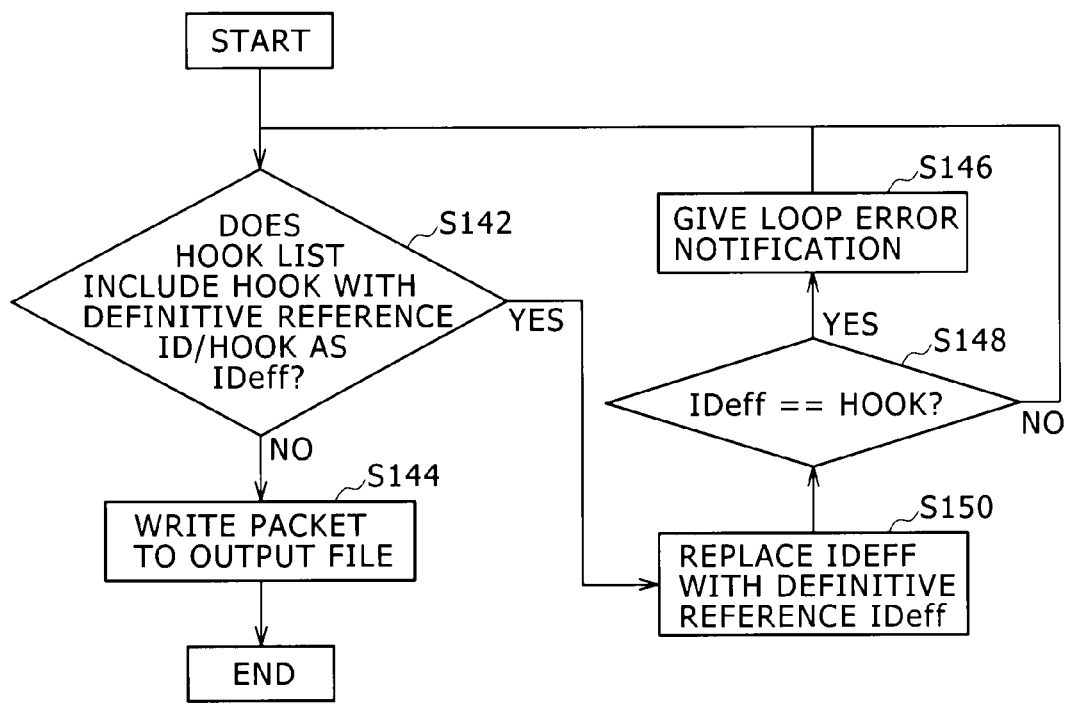
FIG. 17 is a flowchart of steps constituting an error handling process to be added to a file structure analyzing method for use in conjunction with the second embodiment.

According to the second embodiment, the hook list is arranged to have an effective ID (called the IDeff where appropriate) as one of its list items. As soon as a reference relationship is definitively determined, the IDeff of the hook held by the packet in question is updated accordingly. Described below in reference to FIG. 17 is an error handling process added to the file structure analyzing method used in conjunction with the file structure analyzing apparatus 100'. As shown in FIG. 17, the additional process involves checking to determine in step S142 whether or not the hook list 109 retains a hook that holds itself or its ID definitively determined in reference relationship as the IDeff. If in step S142 such a hook is found listed in the hook list 109, then step S150 is reached and the IDeff in question is updated with the definitively determined IDeff.

In step S148, a check is made to determine whether the IDeff is the same as the hook. If in step S148 the IDeff is found to be the same as the hook as shown in FIG. 16C, then S146 is reached and a loop error notification is made. If in step S142 the hook list 109 is not found to retain any hook that holds itself or its definitively determined ID as the IDeff, then step S144 is reached and the packet in question is added to the output file 121. It should be noted that the addition of the packet to the output file 121 in step S144 corresponds to steps S112 and S118 in FIG. 8 and is not part of the newly added error handling process.

Figure 18:
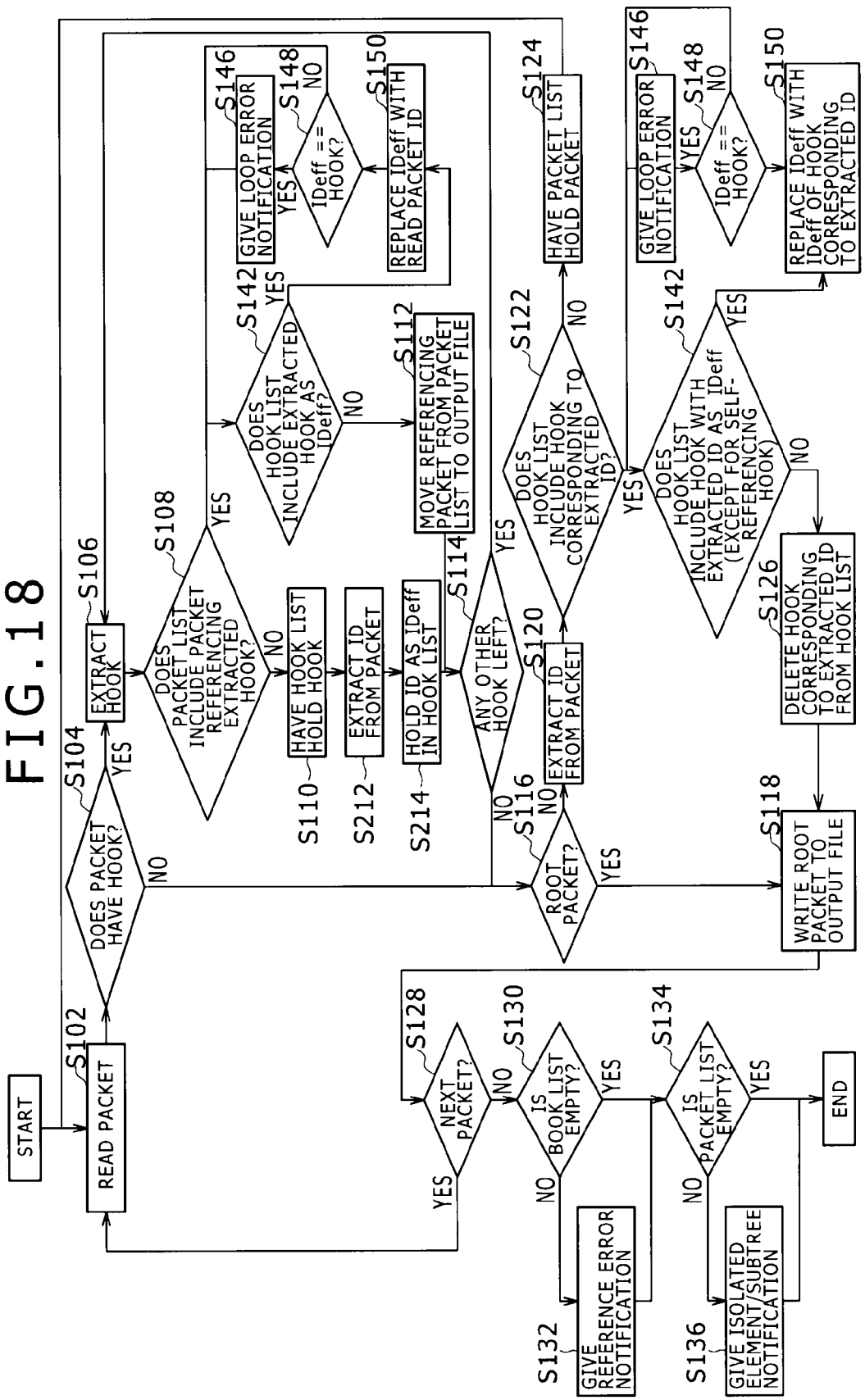
FIG. 18 is a flowchart of steps constituting the file structure analyzing method used in conjunction with the second embodiment.

Described below in reference to FIG. 18 is the file structure analyzing method used in conjunction with the file structure analyzing apparatus 100' as the second embodiment. FIG. 18 is a flowchart of steps constituting the file structure analyzing method for use with the second embodiment. In explaining the file structure analyzing method of FIG. 18, those steps of the method that appeared already in the explanation of the first embodiment will be designated by like reference characters and their descriptions will be omitted where redundant. The file structure analyzing method is explained below by referring to the examples shown in FIGS. 19 through 29 as needed. FIGS. 19 through 29 are schematic views explanatory of how the file structure analyzing method typically works.

Figure 19:
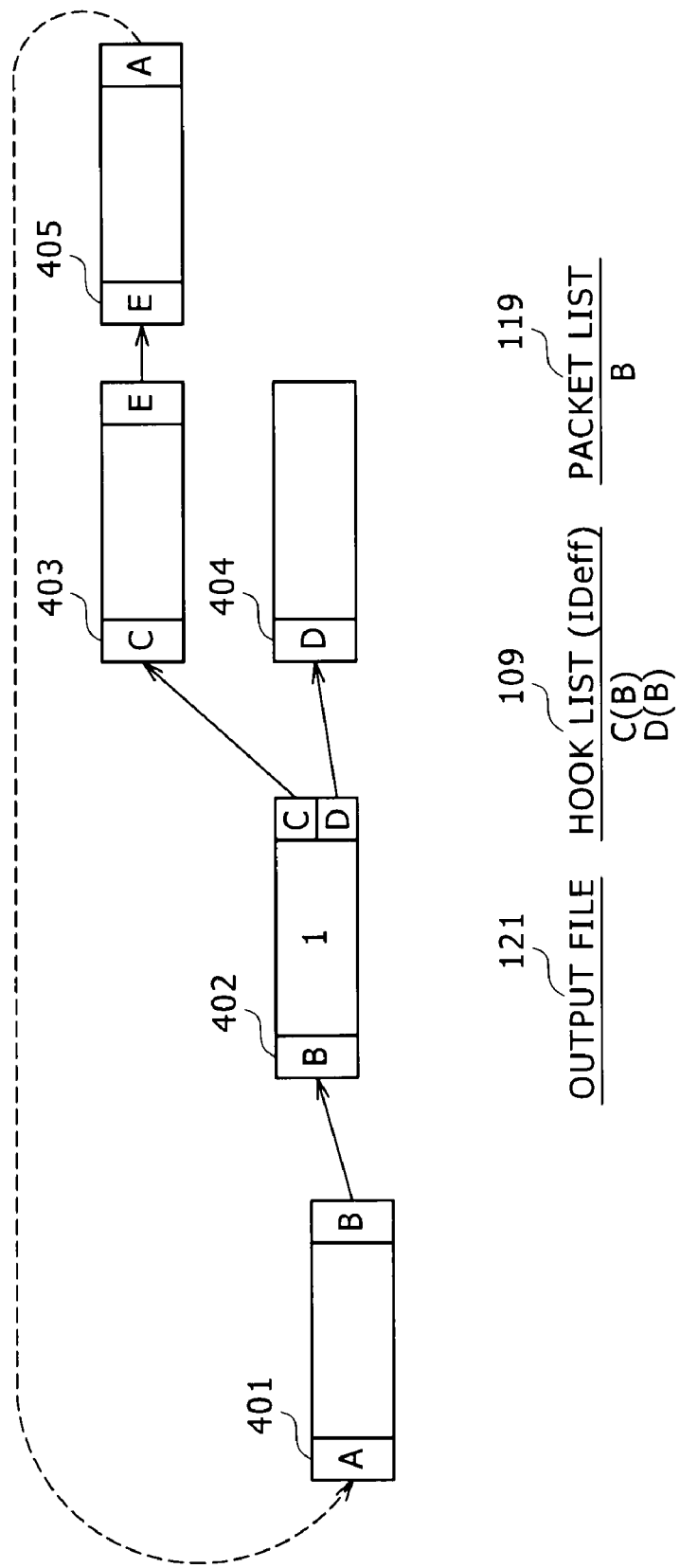
FIG. 19 is a schematic view explanatory of how the file structure analyzing method used in conjunction with the second embodiment typically works.

Described first in reference to FIGS. 18 and 19 is what takes place when a first packet 402 is read out. In step S102, the packet 402 is first read out. If in step S104 the packet 402 is found to have a hook, that hook ("C") is extracted in step S106. In step S108, a check is made to determine whether or not the packet list retains a packet that references the hook "C." If in step S108 the packet list is not found to have such a packet, then step S110 is reached and the hook "C" is written to the hook list. In step S212, the ID "B" of the packet 402 is extracted. In step S214, the ID extracted in step S212 is registered as the IDeff in combination with the hook "C" registered in step S210.

In step S114, a check is made to see if the packet 402 has any other hook. If another hook ("D") is found to exist, then the hook "D" is processed in the same manner as the hook "C" (in steps S106 through S110, S212, S214, and S114). In step S116, a check is made to determine whether or not the packet 402 is the root packet. When the packet 402 is not found to be the root packet in step S116, the ID "B" of the packet 402 is extracted in step S120. In step S122, a check is made to determine whether or not the hook list holds a hook corresponding to the ID "B." If in step S122 no such hook is found listed in the hook list, then step S124 is reached and the packet 402 is placed in the packet list 119.

Figure 20:
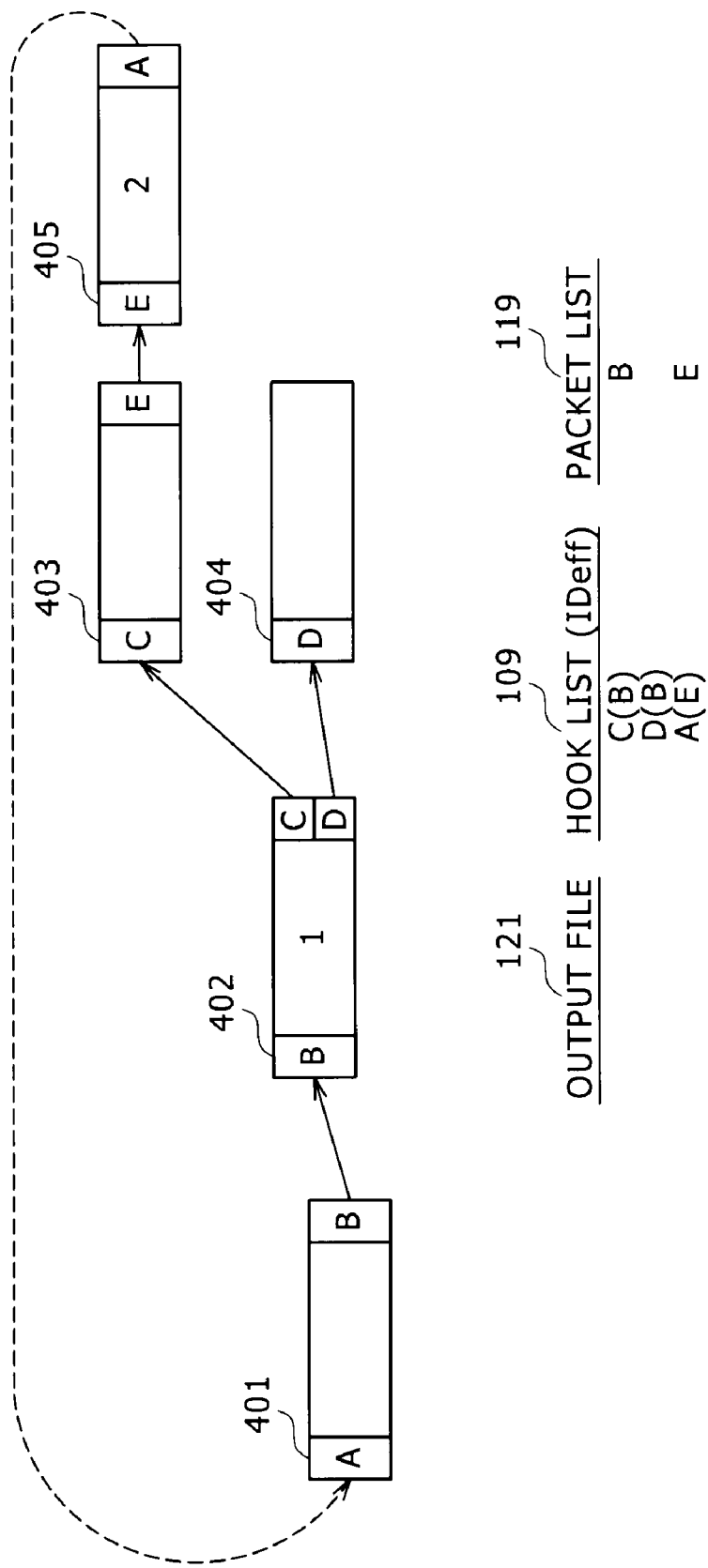
FIG. 20 is another schematic view explanatory of how the file structure analyzing method used in conjunction with the second embodiment typically works.

Described next in reference to FIGS. 18 and 20 is what takes place when a second packet 405 is read out. In step S102, the second packet 405 is read out. In step S104, a check is made to determine whether or not the packet 405 has a hook. When the packet 405 is found to have a hook "A" in step S104, that hook of the packet 405 is extracted in step S106. When the hook "A" extracted in step S206 is not found listed in the packet list 119 in step S108, the hook "A" is written to the hook list 109 in step S110. In step S212, an ID "E" of the packet 405 is extracted. In step S214, the ID extracted in step S212 is registered as the IDeff "E" in combination with the hook "A" registered in step S110. As with the ID "B" of the packet 402, the ID "E" of the packet 405 is placed in the packet list 119 in step S124.

Figure 21:
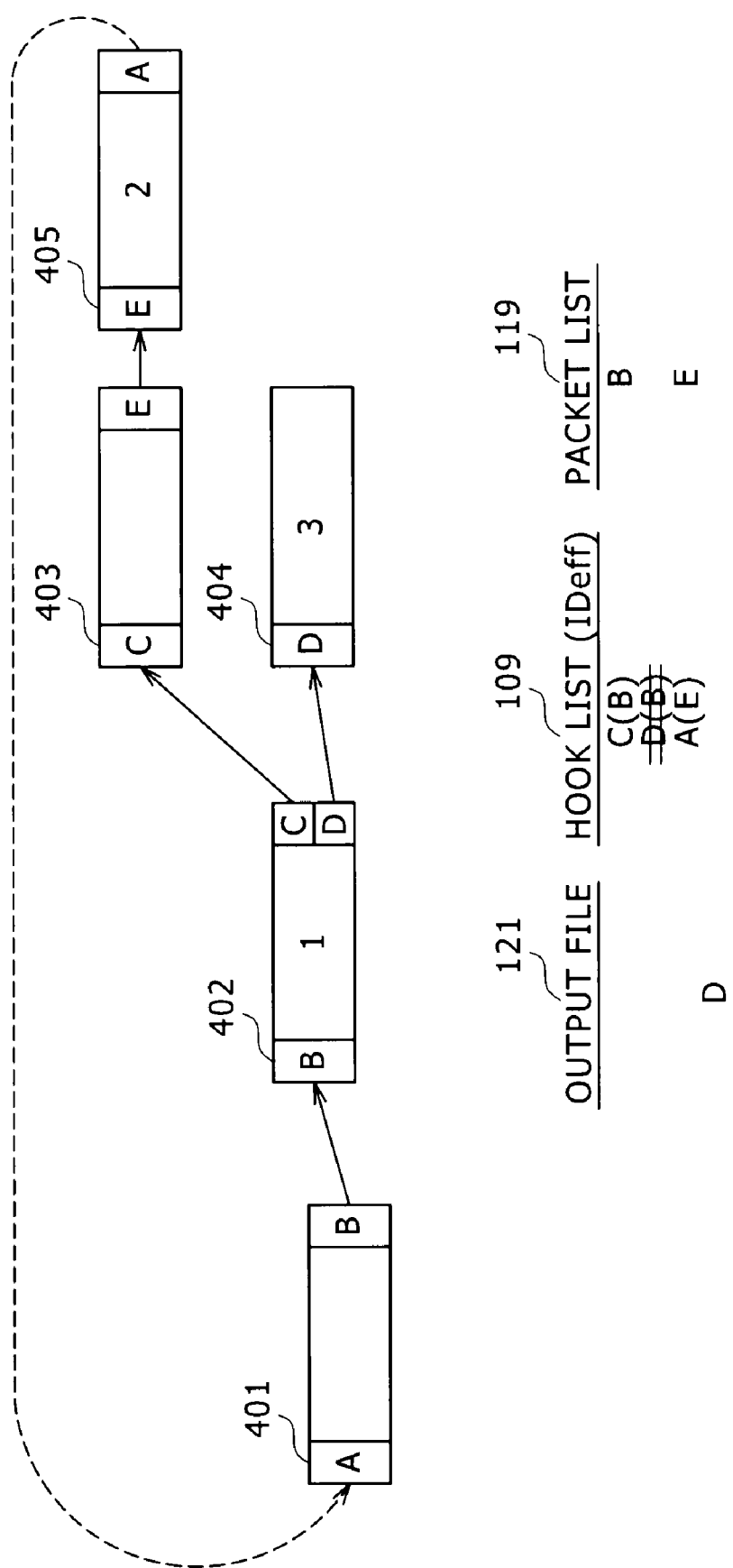
FIG. 21 is another schematic view explanatory of how the file structure analyzing method used in conjunction with the second embodiment typically works.

Described below in reference to FIGS. 18 and 21 is what takes place when a third packet 404 is read out. When the packet 404 read out third is found to have no hook in step S104 of FIG. 18, step S116 is reached and a check is made to determine whether the packet 404 is the root packet. When the packet 404 is not found to be the root packet in step S116, an ID "D" of the packet 404 is extracted in step S120. In step S122, a check is made to determine whether or not the hook list 109 has the hook corresponding to the ID "D" extracted in step S120.

The hook list 109 contains the hook "D" of the packet 402. Thus in step S122, the hook list 109 is found to have the hook corresponding to the ID of the packet 404. In step S142, a check is made to determine whether or not the hook list 109 holds a hook having the ID "D" as the IDeff. When no such hook is found in the hook list in step S142, the hook "D(B)" corresponding to the ID "D" is deleted from the hook list 109 in step S126. This definitively determines the reference source of the packet 404, so that the packet 404 is added to the output file 121 in step S118. If another packet is found to exist in step S128, then that packet is read out in step S102.

Figure 22:
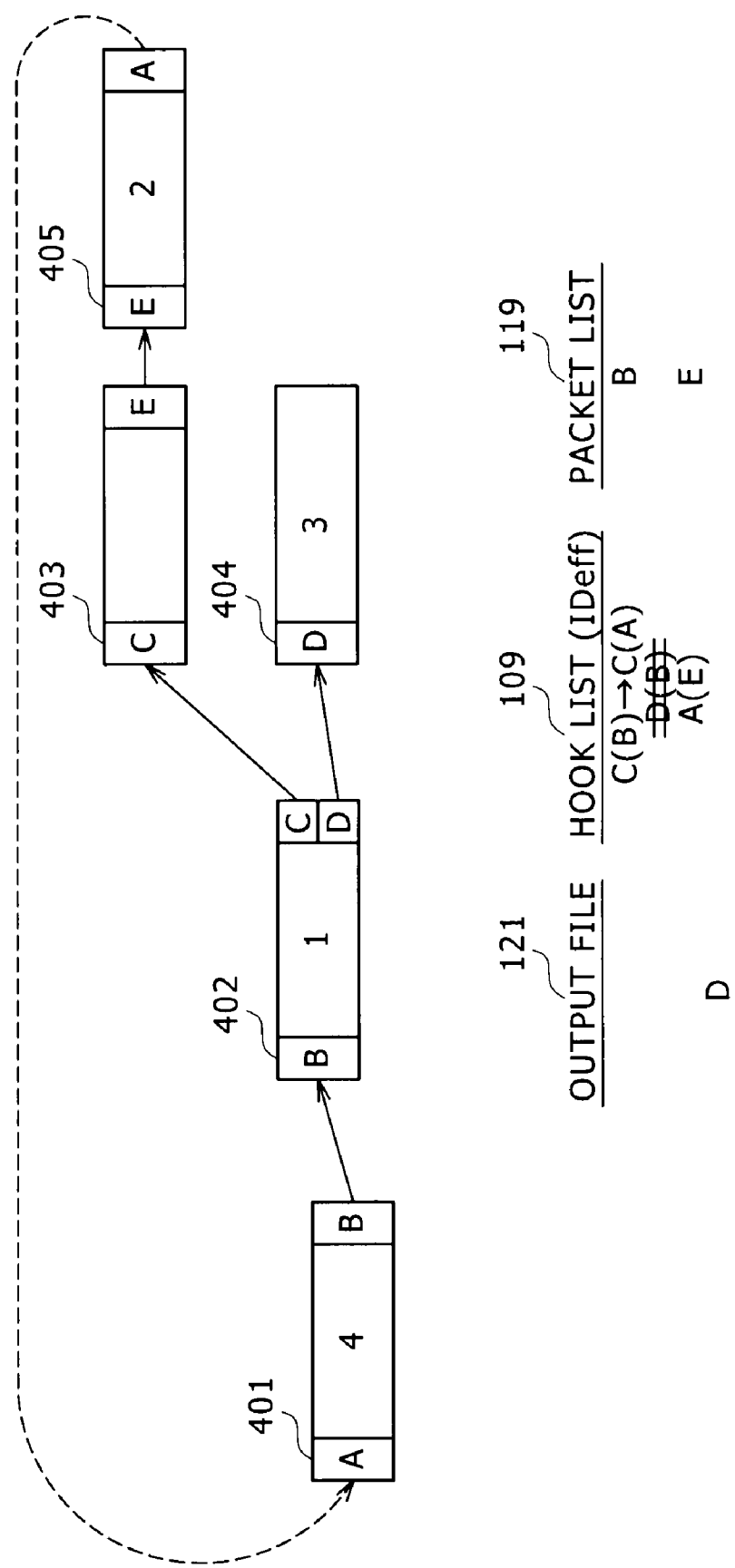
FIG. 22 is another schematic view explanatory of how the file structure analyzing method used in conjunction with the second embodiment typically works.

Described below in reference to FIGS. 18 and 22 through 26 is what takes place when a fourth packet 401 is read out. In step S102, the fourth packet 401 is read out. When in step S104 the packet 401 is found to have a hook "B." that hook "B" is extracted in step S106. When in step S108 the packet list 119 is found to hold the ID corresponding to the hook "B" extracted in step S106, step S142 is reached. In step S142, a check is made to determine whether the hook list 109 retains a hook having the hook "B" as the IDeff. When such a hook "C(B)" is found listed in the hook list 109 in step S142, the IDeff "B" is updated with the ID "A" of the read-out packet in step S150. FIG. 22 is a schematic view explanatory of how the IDeff "B" held by the hook "C" is updated with the effective ID "A" of the read-out packet.

Figure 23:
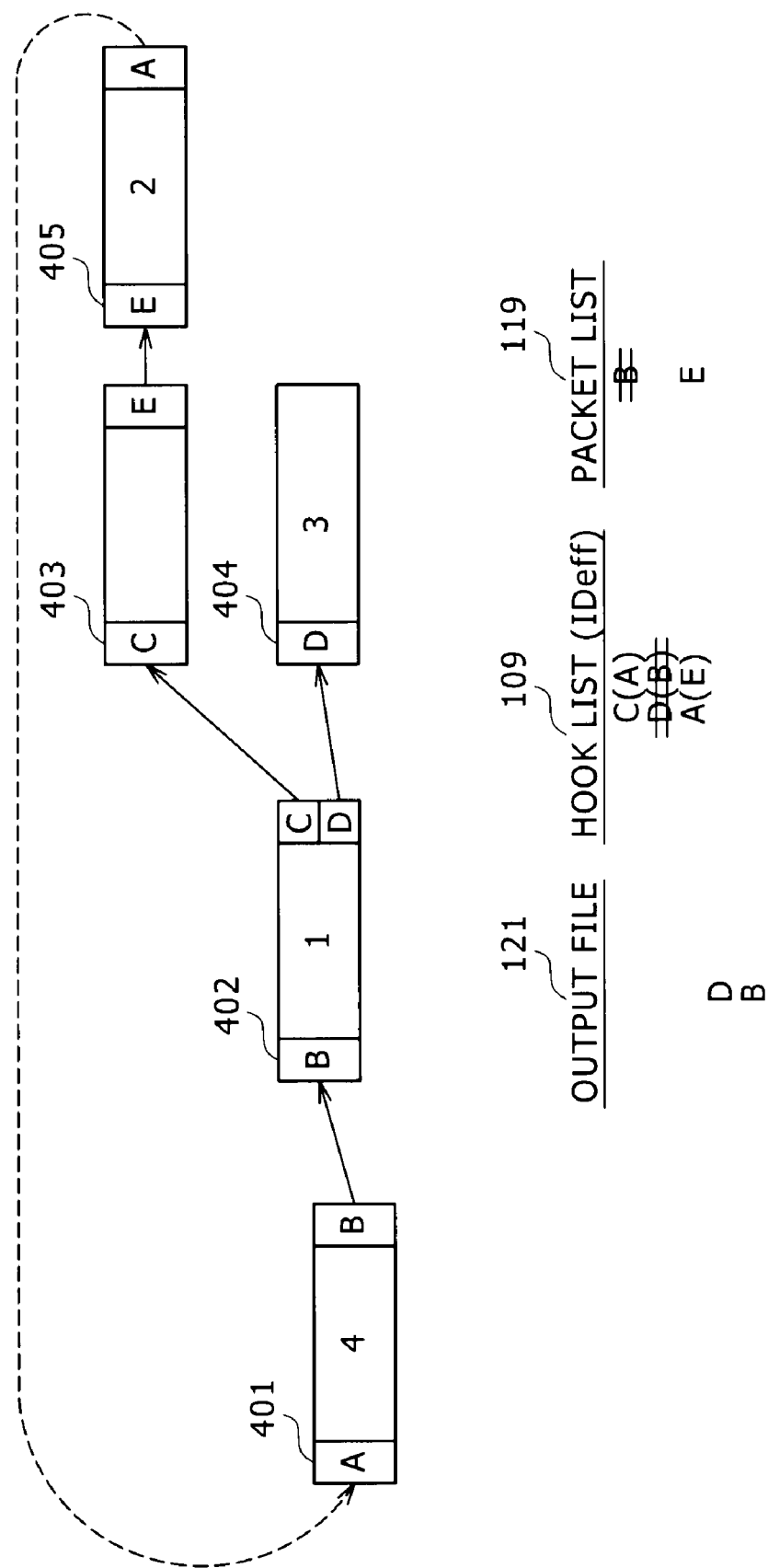
FIG. 23 is another schematic view explanatory of how the file structure analyzing method used in conjunction with the second embodiment typically works.

In step S148, a check is made to determine whether or not the IDeff is the same as the hook. Since the IDeff updated in step S150 is "A" and the hook is "C," step S142 is reached again and another check is made on the IDeff of the next hook. When the hook list 109 in FIG. 22 is not found to hold any more hook having the hook "B" as the IDeff in step S142, step S112 is reached and the packet 402 as the reference destination of the packet 401 is retrieved from the packet list 119 and added to the output file 121. FIG. 23 is a schematic view explanatory of how the packet 402 with the ID "B" is added to the output file 121.

If in step S114 the packet 401 is found to have no other hook than the hook "B," then step S116 is reached and a check is made to see if the packet 401 is the root packet. Unlike the first embodiment, the second embodiment has no means of determining whether the packet 401 is the root packet. For that reason, the packet 401 is not found to be the root packet in step S116 and the ID "A" of the packet 401 is extracted in step S120. In step S122, a check is made to determine whether the hook list 109 retains a hook that corresponds to the ID "A" extracted in step S120. When the hook list 109 is found to hold the hook corresponding to the ID "A," step S142 is reached and a check is made to determine whether the hook list 109 retains a hook having the ID "A" as the IDeff.

Figure 24:
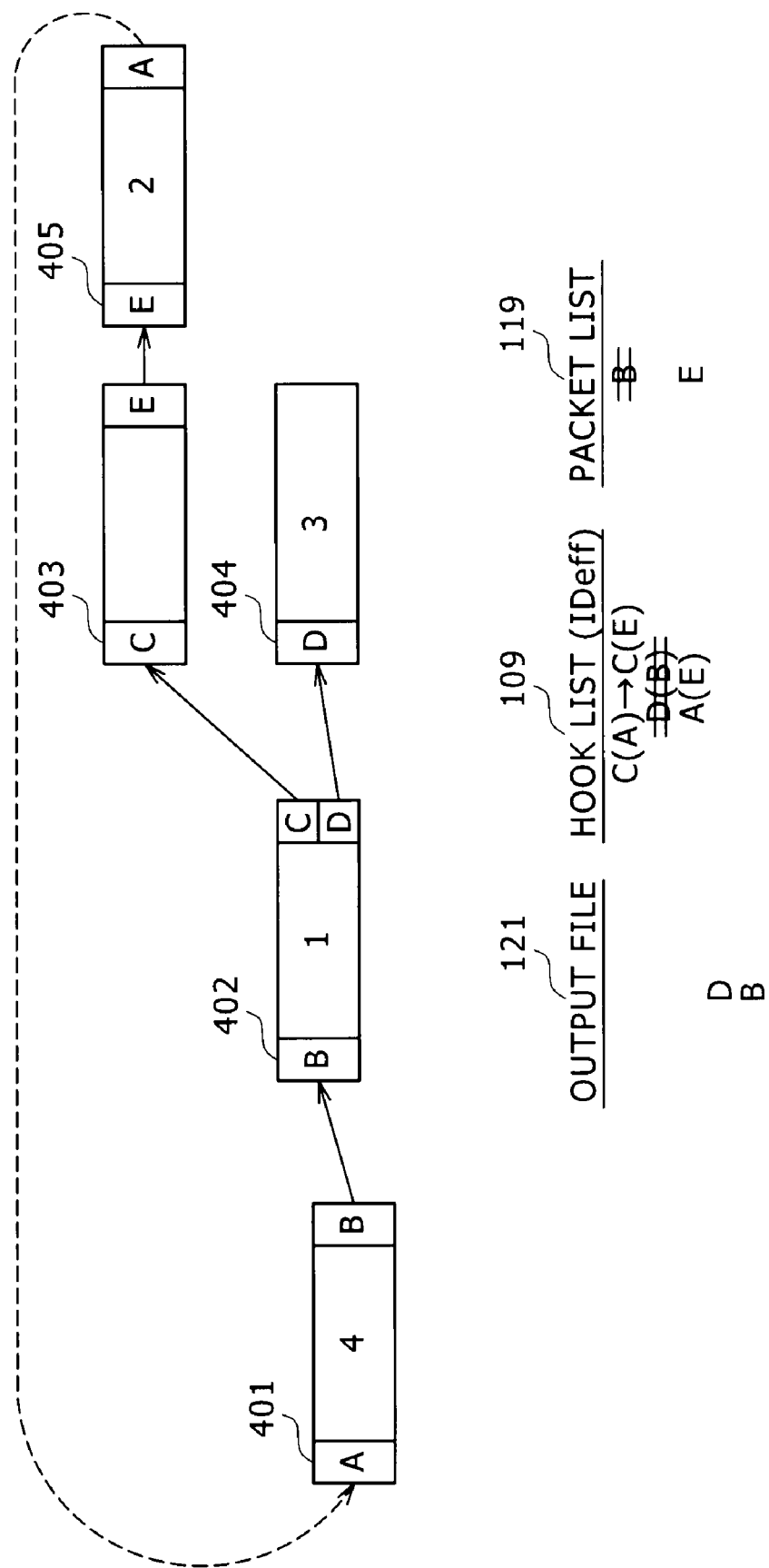
FIG. 24 is another schematic view explanatory of how the file structure analyzing method used in conjunction with the second embodiment typically works.

When in step S142 the hook list 109 is found to hold the hook "C(A)" having the IDeff as the ID "A," step S150 is reached. In step S150, the IDeff "A" is updated with the IDeff "E" of the hook "A(E)" corresponding to the ID "A" of the packet 401. FIG. 24 is a schematic view explanatory of how the IDeff of the hook "C(A)" in the hook list 109 is replaced by "E" to constitute the hook "C(E)."

Figure 25:
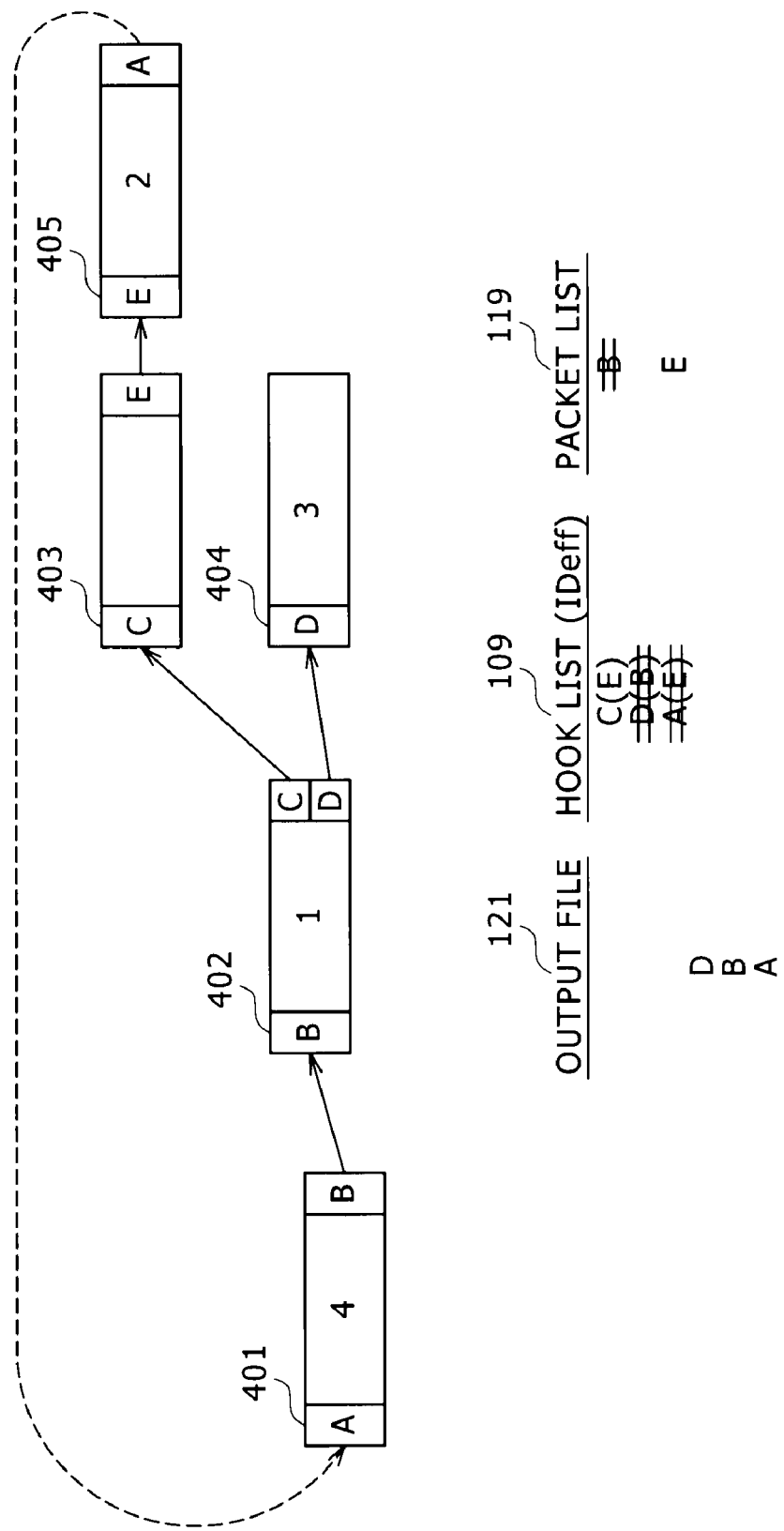
FIG. 25 is another schematic view explanatory of how the file structure analyzing method used in conjunction with the second embodiment typically works.

In step S148, a check is made to determine whether or not the updated IDeff "E" is the same as the hook "C." Since the IDeff updated in step S150 is "E" and the hook is "C," step S142 is reached again and another check is made on the IDeff of the next hook. If in step S142 the hook list 109 is not found to hold a hook having the ID "A" of the packet 401 as the IDeff, then step S126 is reached. In step S126, the hook "A(E)" corresponding to the ID "A" of the packet 401 is deleted from the hook list 109. In step S118, the packet 401 is added to the output file 121. FIG. 25 is a schematic view explanatory of how the packet 401 with the ID "A" is added to the output file 121. If in step S128 another packet is found to exist, that packet is read out in step S102.

Figure 26:
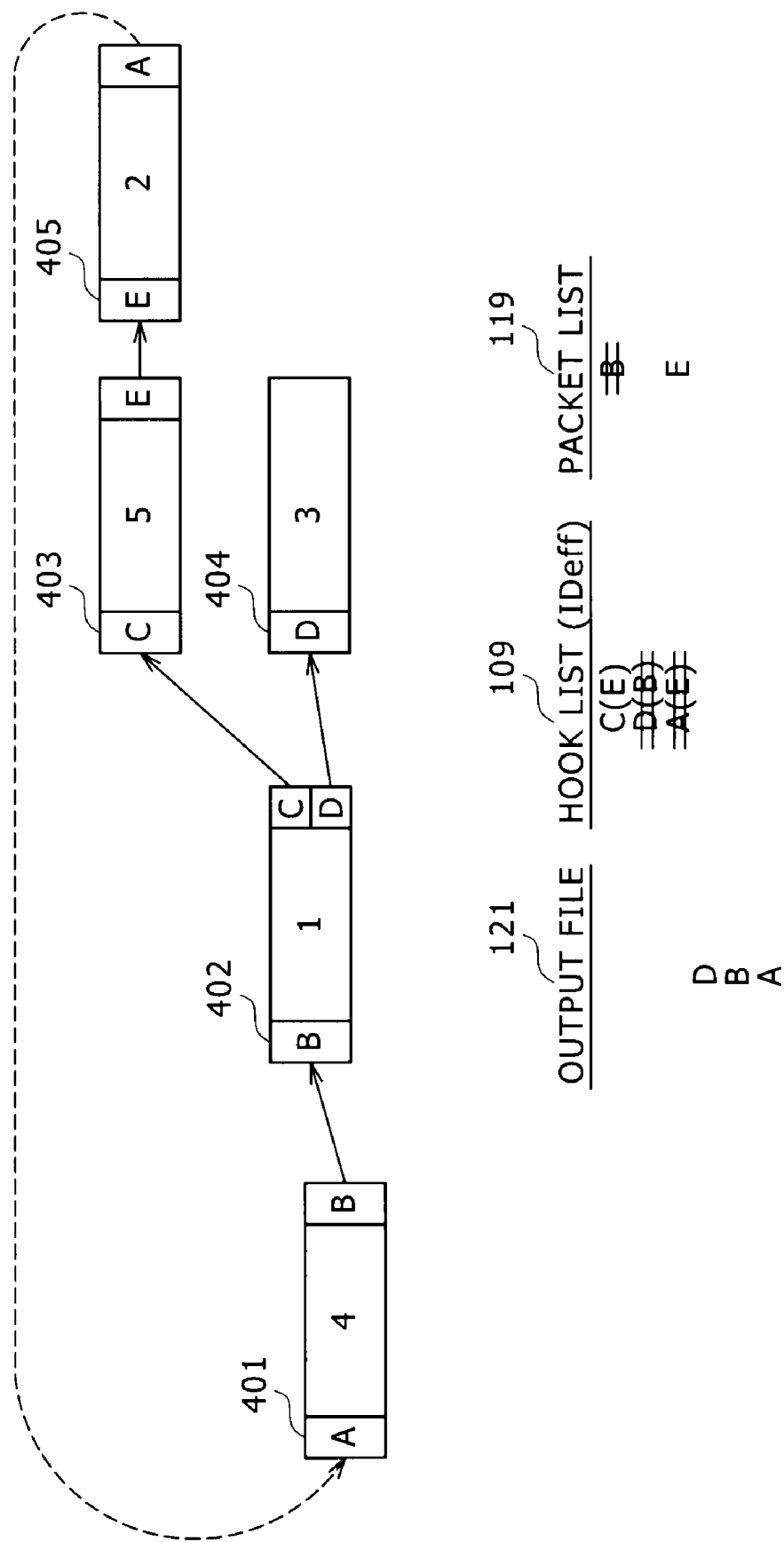
FIG. 26 is another schematic view explanatory of how the file structure analyzing method used in conjunction with the second embodiment typically works.
Figure 27:
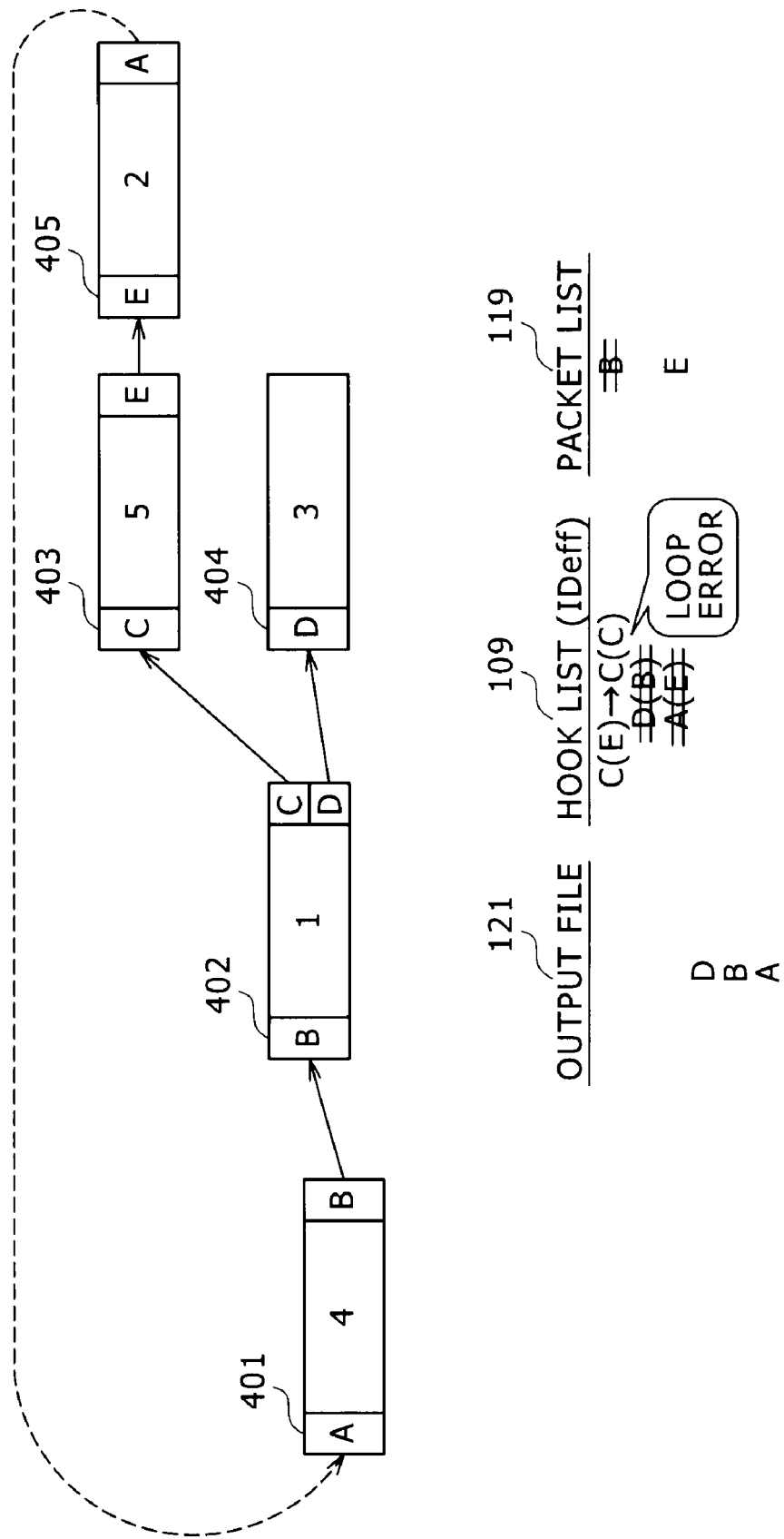
FIG. 27 is another schematic view explanatory of how the file structure analyzing method used in conjunction with the second embodiment typically works.

Described below in reference to FIGS. 18 and 26 through 29 is what takes place when a fifth packet 403 is read out. In step S102, the fifth packet 403 is read out. When the packet 403 is found to have a hook "E" in step S104, that hook "E" is extracted in step S106. When in step S108 the packet list 119 is found to hold the hook "E" extracted in step S106, step S142 is reached. In step S142, a check is made to determine whether or not the hook list 109 retains a hook having the hook "E" as the IDeff. When such a hook "C(E)" is found listed in the hook list 109 in step S142, the IDeff "E" is updated with the ID "C" of the read-out packet in step S150. FIG. 26 is a schematic view explanatory of what takes place when the packet 403 is read out. FIG. 27 is a schematic view explanatory of what happens when the IDeff "E" of the hook "C" is updated with the ID "C" of the read-out packet.

Figure 28:
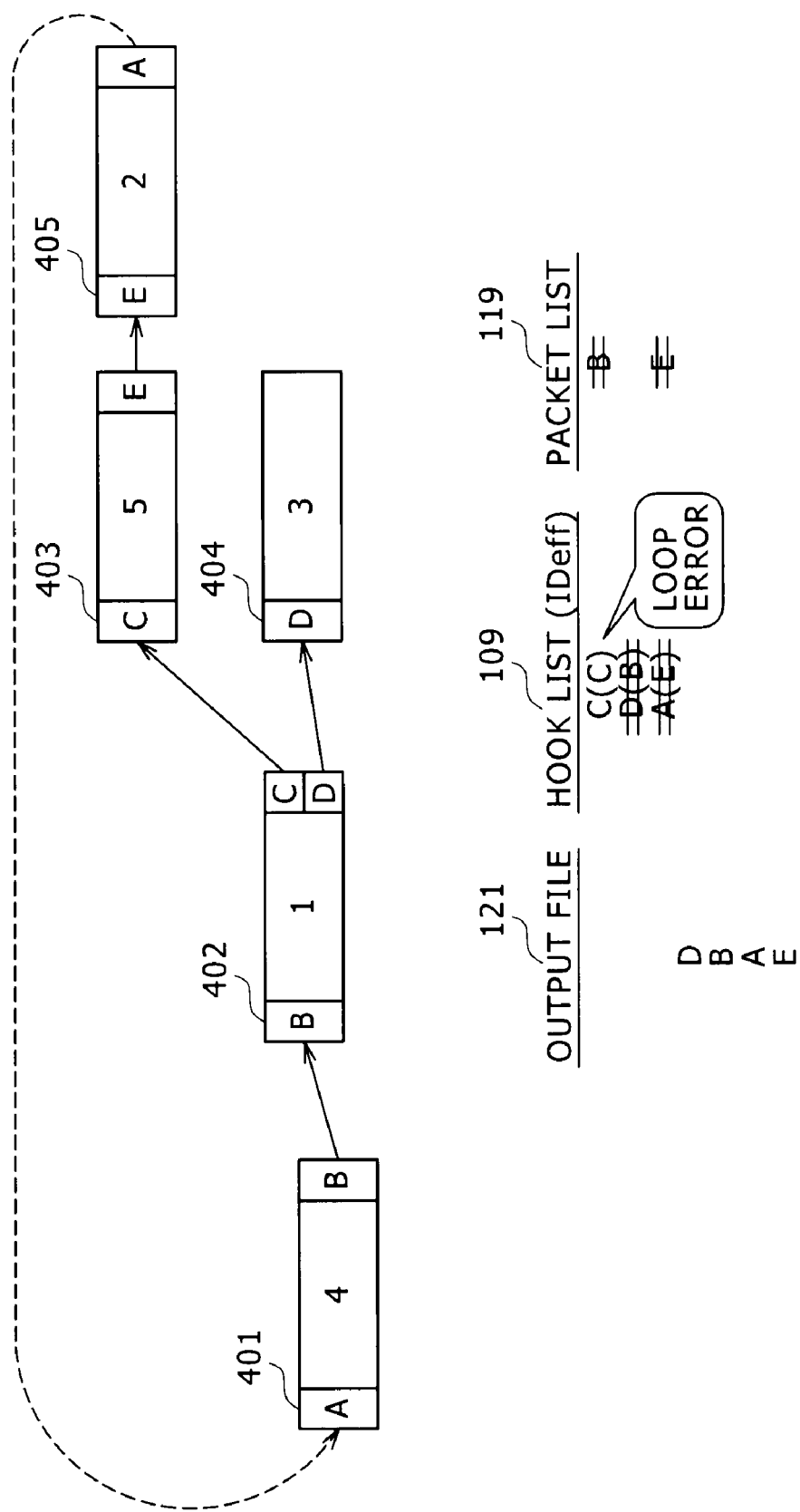
FIG. 28 is another schematic view explanatory of how the file structure analyzing method used in conjunction with the second embodiment typically works.

In step S148, a check is made to determine whether or not the IDeff is the same as the hook. Since the IDeff updated in step S150 is "C" and the hook is "C," step S146 is reached and a loop error notification is made. If in step S142 the hook list 109 is found to hold no other hook that has the hook "E" of the packet 403 as the IDeff, then step S112 is reached and the packet 405 as the reference destination of the packet 403 is retrieved from the packet list 119 and added to the output file 121. FIG. 28 is a schematic view explanatory of what takes place when the packet 405 with the ID "E" is added to the output file 121.

If in step S114 the packet 403 is not found to have any other hook than the hook "E," then step S116 is reached and a check is made to determine whether or not the packet 403 is the root packet. When the packet 403 is not found to be the root packet, step S120 is reached and the ID "C" of the packet 403 is extracted. In step S122, a check is made to determine whether or not the hook list 109 holds a hook corresponding to the ID "C" extracted in step S120. When in step S120 the hook list 109 is found to retain the hook corresponding to the ID "C," step S142 is reached. In step S142, a check is made to determine whether or not the hook list 109 has a hook having the ID "C" as the IDeff.

Although in step S142 the hook list 109 is found to hold the hook "C(C)" that has the IDeff as "C," step S126 is reached because a self-referencing hook is excluded. In step S126, the hook "C(C)" corresponding to the ID "C" of the packet 403 is deleted from the hook list. In step S118, the packet 403 with the ID "C" is added to the output file 121. FIG. 29 is a schematic view explanatory of what takes place when the hook "C(C)" is deleted from the hook list 109 and added to the output file 121.

If no other packet is found to exist in step S128, then step S130 is reached and a check is made to determine whether or not the hook list 109 is empty. If in step S130 the hook list 109 is not found empty, that means the reference relationship is not definitively determined. Step S130 is then followed by step S132 in which a reference error notification is made. In step S134, a check is made to determine whether or not the packet list 119 is empty. If in step S134 the packet list 119 is not found empty, then step S136 is reached and notification is made that an isolated element packet or a subtree is recognized. The foregoing description has been about the file structure analyzing method used in conjunction with the second embodiment.

According to the file structure analyzing apparatus 100' practiced as the second embodiment, as with the file structure analyzing apparatus 100 constituting the first embodiment, a plurality of distinct element packets are input successively. The external referrers of the distinct element packets of which the reference destinations have yet to be definitively determined are placed temporarily in the external referrer list 109 of the external referrer holding section 108. The unique identifiers of the distinct element packets of which the reference sources have yet to be definitively determined are put temporarily on the unique identifier list 119 of the unique identifier holding section 118. The reference relationship of each of the input distinct element packets is analyzed successively. Every time the reference relationship of a given distinct element packet is definitively determined, the external referrer and unique identifier of the distinct element packet in question are deleted from the external referrer list 109 and unique identifier list 119, respectively.

According to the second embodiment, each external referrer in the external referrer list 109 of the external referrer holding section 108 is held therein in combination with the (effective) unique identifier of a (synthesized) effective distinct element packet having the listed external referrer. When the reference relationship is definitively determined, the effective unique identifier held in conjunction with the applicable external referrer is replaced by the effective unique identifier of the distinct element packet found to be the reference source. The effective unique identifier signifies the unique identifier of a higher-order composite distinct element packet derived from the synthesis of distinct element packets based on the definitively determined reference relationship. With the above scheme in place, where there is no way of determining the root element, a loop error can be detected if the composite packet is found to be referencing itself. In this manner, the tree structure inside a given file can be analyzed more accurately than before without expanding all of the external referrers and unique identifiers of the distinct element packets involved.

It is to be understood that while the invention has been described in conjunction with specific embodiments with reference to the accompanying drawing, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:
1. A file structure analyzing apparatus for analyzing a file including a group of structured data formed into a tree struc- ture by having a plurality of distinct element packets referenced externally, the file structure analyzing apparatus comprising:
- a distinct element packet input section configured to successively input, via a processor, the plurality of distinct element packets, each of the distinct element packets including a unique identifier for identifying each distinct element packet and an external referrer for indicating an external reference destination at which to reference externally another distinct element packet using the unique identifier of the another distinct element packet;
- an input stream section configured to input structured files expressed in the tree structure;
- a distinct element packet analysis section configured to extract said unique identifier, identifying the inputted distinct element packet and the external referrer;
- an external referrer holding section configured to temporarily hold, in a memory, the external referrer of one of the distinct element packets of which the external reference destination has not yet been definitively determined, wherein said external referrer holding section stores an external referrer list;
- an external referrer management section configured to delete from said external referrer list the external referrer whose external reference destination has been definitively determined;
- a unique identifier holding section configured to temporarily hold, in the memory, the unique identifier of one of the distinct element packets of which a reference source has not yet been definitively determined, wherein said unique identifier holding section stores a unique identifier list;
- a unique identifier management section configured to delete from the unique identifier list the unique identifier of the distinct element packet of which the external reference source has been determined; and
- a reference relationship analysis section configured to detect tree structure errors by successively analyzing, via the processor, a reference relationship of each of the plurality of distinct element packets input to the distinct element packet input section, the reference relationship analysis section determining, for each of the plurality of distinct element packets,
  - whether the distinct element packet contains an external referrer that is the same as a unique identifier held by the unique identifier holding section and, if not, adding the external referrer to the external referrer holding section, and
  - whether the distinct element packet contains a unique identifier that is the same as an external referrer held by the external referrer holding section and, if not, adding the unique identifier to the unique identifier holding section
- a file generation/write-once section configured to generate a file acquired from a distinct element packet temporary storage section and that stores the distinct element packet whose reference relationships have been definitively determined.

2. The file structure analyzing apparatus according to claim 1, wherein,
when the external referrer of an input distinct element packet is found to be the same as the unique identifier held by the unique identifier holding section, the reference relationship analysis section determines that the external reference destination of the distinct element packet identified by the unique identifier is definitively determined and deletes the unique identifier from the unique identifier holding section; and
when the unique identifier of the input distinct element packet is found to be the same as the external referrer held by the external referrer holding section, the reference relationship analysis section determines that the reference source of the distinct element packet associated with the external referrer is definitively determined and deletes the external referrer from the external referrer holding section.

3. The file structure analyzing apparatus according to claim 1, wherein
the external referrer holding section holds the external referrer in paired relation with the unique identifier corresponding to the external referrer; and
when the reference source of one of the distinct element packets is definitively determined, the reference relationship analysis section changes the unique identifier held in paired relation with the external referrer held by the external referrer holding section into an effective unique identifier of the distinct element packet definitively determined as the reference source.

4. The file structure analyzing apparatus according to claim 3, wherein, when the effective unique identifier of the distinct element packet held in paired relation with the external referrer and changed by the reference relationship analysis section is found to be the same as a paired external referrer, the reference relationship analysis section detects a tree structure loop error.

5. The file structure analyzing apparatus according to claim 1, further comprising:
a distinct element packet storage section configured to store the distinct element packets deleted by the reference relationship analysis section.

6. The file structure analyzing apparatus according to claim 1, wherein the reference relationship analysis section analyzes the reference relationship of one of the plurality of distinct element packets by regarding the distinct element packet in question as a root element packet.

7. The file structure analyzing apparatus according to claim 1, wherein the group of structured data constitutes header metadata of a material exchange format file.

8. A file structure analyzing method for analyzing a file including a group of structured data formed into a tree structure by having a plurality of distinct element packets referenced externally, the file structure analyzing method comprising:
successively inputting, via a processor, the plurality of distinct element packets, each of the distinct element packets including a unique identifier for identifying each distinct element packet and an external referrer for indicating an external reference destination at which to reference externally another distinct element packet using the unique identifier of the another distinct element packet;
inputting structured files expressed in the tree structure;
extracting said unique identifier, identifying the inputted distinct element packet and the external referrer;
temporarily holding, in a memory, an external referrer list and the external referrer of one of the distinct element packets of which the external reference destination has not yet been definitively determined;
deleting from said external referrer list the external referrer whose external reference destination has been definitively determined;

temporarily holding, in the memory, a unique identifier list and the unique identifier of one of the distinct element packets of which a reference source has not yet been definitively determined;

deleting from the unique identifier list the unique identifier of the distinct element packet of which the external reference source has been determined; and detecting tree structure errors by successively analyzing, via the processor, a reference relationship of each of the plurality of distinct element packets input in the inputting step;

determining, for each of the plurality of distinct element packets, whether the distinct element packet contains an external referrer that is the same as a unique identifier held by the unique identifier holding section and, if not, adding the external referrer to the external referrer holding section, and whether the distinct element packet contains a unique identifier that is the same as an external referrer held by the external referrer holding section and, if not, adding the unique identifier to the unique identifier holding section generating a file acquired from a distinct element packet temporary storage section and that stores the distinct element packet whose reference relationships have been definitively determined.

9. A non-transitory computer-readable medium storing computer readable instructions thereon for analyzing a file including a group of structured data formed into a tree structure by having a plurality of distinct element packets referenced externally, the computer readable instructions which when executed by a computer cause the computer to perform a method comprising:

successively inputting the plurality of distinct element packets, each of the distinct element packets including a unique identifier for identifying each distinct element packet and an external referrer for indicating an external reference destination at which to reference externally another distinct element packet using the unique identifier of the another distinct element packet;

inputting structured files expressed in the tree structure;

extracting said unique identifier, identifying the inputted distinct element packet and the external referrer;

temporarily holding an external referrer list and the external referrer of one of the distinct element packets of which the external reference destination has not yet been definitively determined;

deleting from said external referrer list the external referrer whose external reference destination has been definitively determined;

temporarily holding a unique identifier list and the unique identifier of one of the distinct element packets of which a reference source has not yet been definitively determined;

deleting from the unique identifier list the unique identifier of the distinct element packet of which the external reference source has been determined; and detecting tree structure errors by successively analyzing a reference relationship of each of the plurality of distinct element packets input to the distinct element packet input section;

determining, for each of the plurality of distinct element packets, whether the distinct element packet contains an external referrer that is the same as a unique identifier held by the unique identifier holding section and, if not, adding the external referrer to the external referrer holding section, and whether the distinct element packet contains a unique identifier that is the same as an external referrer held by the external referrer holding section and, if not, adding the unique identifier to the unique identifier holding section generating a file acquired from a distinct element packet temporary storage section and that stores the distinct element packet whose reference relationships have been definitively determined.

10. A file structure analyzing apparatus for analyzing a file including a group of structured data formed into a tree structure by having a plurality of distinct element packets referenced externally, the file structure analyzing apparatus comprising:

distinct element packet input means for successively inputting the plurality of distinct element packets, each of the distinct element packets including a unique identifier for identifying each distinct element packet and an external referrer for indicating an external reference destination at which to reference externally another distinct element packet using the unique identifier of the another distinct element packet;

input stream means for inputting structured files expressed in the tree structure;

distinct element packet analysis means for extracting said unique identifier, identifying the inputted distinct element packet and the external referrer;

external referrer holding means for temporarily holding the external referrer of one of the distinct element packets of which the external reference destination has not yet been definitively determined, wherein said external referrer holding means stores an external referrer list;

external referrer management means for deleting from said external referrer list the external referrer whose external reference destination has been definitively determined;

unique identifier holding means for temporarily holding the unique identifier of one of the distinct element packets of which a reference source has not yet been definitively determined, wherein said unique identifier holding means stores a unique identifier list;

unique identifier management section means for deleting from the unique identifier list the unique identifier of the distinct element packet of which the external reference source has been determined; and reference relationship analysis processing means for detecting tree structure errors by analyzing successively a reference relationship of each of the plurality of distinct element packets input to the distinct element packet input means, the reference relationship analysis means determining, for each of the plurality of distinct element packets, whether the distinct element packet contains an external referrer that is the same as a unique identifier held by the unique identifier holding section and, if not, adding the external referrer to the external referrer holding section, and whether the distinct element packet contains a unique identifier that is the same as an external referrer held by the external referrer holding section and, if not, adding the unique identifier to the unique identifier holding section file generation/write-once means for generating a file acquired from a distinct element packet temporary storage section and that stores the distinct element packet whose reference relationships have been definitively determined.

11. The file structure analyzing apparatus according to claim 2, wherein the reference relationship analysis section determines that the distinct element packet in question is a root element packet when the unique identifier of the root element packet is not externally referenced by the external referrer of another distinct element packet or when the root element packet contains only an external referrer.

12. The file structure analyzing apparatus according to claim 5, further comprising:
   a file generation section configured to generate a file containing distinct element packets whose reference relationship have been definitively determined.

13. The file structure analyzing apparatus according to claim 12, wherein the file generation section generates the file by acquiring from the distinct element packet storage section the distinct element packet retaining the unique identifier deleted from the unique identifier holding section.

14. The file structure analyzing apparatus according to claim 11, wherein the reference relationship analysis section only determines whether the distinct element packet is a root element packet when a distinct element packet contains
   an external referrer that is not the same as the unique identifier held by the unique identifier holding section, and
   a unique identifier that is not the same as an external referrer held by the external referrer holding section.

15. The file structure analyzing apparatus according to claim 1,
   wherein the distinct element packet input section accepts the input stream and then forwards the input stream to the distinct element packet temporary storage section which stores the distinct element packets from the distinct element packet input section,
   wherein the distinct element packet retains the unique identifier deleted from the unique identifier list and writes the acquired distinct element packet to the file.

* * * * *